United States Patent
Gossain et al.

(10) Patent No.: US 9,537,819 B2
(45) Date of Patent: Jan. 3, 2017

(54) FACILITATING THE RESOLUTION OF ADDRESS CONFLICTS IN A NETWORKED MEDIA PLAYBACK SYSTEM

(71) Applicant: Sonos, Inc, Santa Barbara, CA (US)

(72) Inventors: Hrishikesh Gossain, Santa Barbara, CA (US); Jose Graziani, Shrewsbury, MA (US); Jeffrey M. Peters, Leominster, MA (US); Michael Agerbak, Arlington, MA (US)

(73) Assignee: Sonos, Inc., Santa Barbara, CA (US)

( * ) Notice: Subject to any disclaimer, the term of this patent is extended or adjusted under 35 U.S.C. 154(b) by 187 days.

(21) Appl. No.: 14/041,900

(22) Filed: Sep. 30, 2013

(65) Prior Publication Data
US 2015/0095486 A1    Apr. 2, 2015

(51) Int. Cl.
| | |
|---|---|
| *G06F 15/173* | (2006.01) |
| *H04L 29/12* | (2006.01) |
| *H04L 12/28* | (2006.01) |
| *H04N 21/4363* | (2011.01) |
| *H04N 21/439* | (2011.01) |
| *H04N 21/482* | (2011.01) |

(52) U.S. Cl.
CPC ....... *H04L 61/2046* (2013.01); *H04L 12/2803* (2013.01); *H04L 61/2015* (2013.01); *H04N 21/439* (2013.01); *H04N 21/43637* (2013.01); *H04N 21/482* (2013.01); *H04R 2227/005* (2013.01)

(58) Field of Classification Search
CPC .. H04L 61/2046; H04L 61/2015; H04L 43/00; H04L 12/2803; H04L 29/12; H04R 2227/005
See application file for complete search history.

(56) References Cited

U.S. PATENT DOCUMENTS

| | | | |
|---|---|---|---|
| 5,923,902 | A  | 7/1999 | Inagaki |
| 6,256,554 | B1 | 7/2001 | DiLorenzo |
| 6,404,811 | B1 | 6/2002 | Cvetko et al. |

(Continued)

FOREIGN PATENT DOCUMENTS

WO    0153994    7/2001

OTHER PUBLICATIONS

Voyetra Turtle Beach, Inc., "AudioTron Quick Start Guide," Version 1.0, Mar. 2001 (24 pages).

(Continued)

*Primary Examiner* — Ario Etienne
*Assistant Examiner* — Kidest Mendaye

(57) ABSTRACT

Examples are disclosed and described to facilitate resolution of Internet Protocol address conflicts. An example method includes listening, by a first playback device having a first IP address, to a specified server port, receiving, by the first playback device from a second playback device via the specified server port, a message, wherein the message identifies a second IP address, wherein the second IP address has been assigned to the second playback device, determining, by the first playback device, whether the first IP address is the same as the second IP address, and when the first IP address is the same as the second IP address, obtaining, by the first playback device, a new IP address, wherein the new IP address is different from the first IP address and the second IP address.

23 Claims, 16 Drawing Sheets

(56) References Cited

U.S. PATENT DOCUMENTS

| | | | |
|---|---|---|---|
| 6,507,869 B1* | 1/2003 | Franke | H04L 12/2602 709/220 |
| 6,522,886 B1 | 2/2003 | Youngs et al. | |
| 6,611,537 B1 | 8/2003 | Edens et al. | |
| 6,631,410 B1 | 10/2003 | Kowalski et al. | |
| 6,757,517 B2 | 6/2004 | Chang | |
| 6,778,869 B2 | 8/2004 | Champion | |
| 7,127,524 B1* | 10/2006 | Renda et al. | 709/245 |
| 7,130,608 B2 | 10/2006 | Hollstrom et al. | |
| 7,130,616 B2 | 10/2006 | Janik | |
| 7,143,939 B2 | 12/2006 | Henzerling | |
| 7,200,649 B1 | 4/2007 | Batke et al. | |
| 7,236,773 B2 | 6/2007 | Thomas | |
| 7,483,538 B2 | 1/2009 | McCarty et al. | |
| 7,571,014 B1* | 8/2009 | Lambourne | H04R 27/00 700/94 |
| 7,643,894 B2 | 1/2010 | Braithwaite et al. | |
| 7,657,910 B1 | 2/2010 | McAulay et al. | |
| 7,853,341 B2 | 12/2010 | McCarty et al. | |
| 8,014,423 B2 | 9/2011 | Thaler et al. | |
| 8,045,952 B2 | 10/2011 | Qureshey et al. | |
| 8,089,981 B2 | 1/2012 | Hiraki | |
| 8,103,009 B2 | 1/2012 | McCarty et al. | |
| 8,234,395 B2 | 7/2012 | Millington | |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0124097 A1* | 9/2002 | Isely | H04H 60/95 709/231 |
| 2003/0157951 A1 | 8/2003 | Hasty, Jr. | |
| 2004/0024478 A1 | 2/2004 | Hans et al. | |
| 2005/0138158 A1* | 6/2005 | Challener | G06F 8/61 709/223 |
| 2005/0207447 A1 | 9/2005 | Sekiguchi et al. | |
| 2007/0142944 A1 | 6/2007 | Goldberg et al. | |
| 2007/0183426 A1* | 8/2007 | Daude | H04L 29/12009 370/392 |
| 2008/0064396 A1* | 3/2008 | Igoe | H04L 12/2809 455/433 |
| 2009/0006635 A1* | 1/2009 | Siegmund | H04L 29/12028 709/228 |
| 2009/0172195 A1* | 7/2009 | Risbud | 709/245 |
| 2010/0189029 A1* | 7/2010 | Jing | H04L 29/1232 370/328 |
| 2013/0166706 A1* | 6/2013 | Christenson et al. | 709/221 |
| 2013/0166737 A1* | 6/2013 | Christenson | H04L 69/40 709/224 |
| 2014/0026207 A1* | 1/2014 | Wang | H04L 41/28 726/12 |

OTHER PUBLICATIONS

Voyetra Turtle Beach, Inc., "AudioTron Reference Manual," Version 3.0, May 2002 (70 pages).

Voyetra Turtle Beach, Inc., "AudioTron Setup Guide," Version 3.0, May 2002 (38 pages).

Bluetooth, "Specification of the Bluetooth System: The Ad Hoc SCATTERNET for Affordable and Highly Functional Wireless Connectivity," Core, Version 1.0 A, Jul. 26, 1999 (1068 pages). (Document uploaded in 7 different files).

Bluetooth, "Specification of the Bluetooth System: Wireless Connections Made Easy," Core, Version 1.0 B, Dec. 1, 1999 (1076 pages). (Document uploaded in 9 different files).

Dell Computer Corporation, "Dell Digital Audio Receiver: Reference Guide," Jun. 2000 (70 pages).

Dell Computer Corporation, "Dell Digital Audio Receiver: Start Here," Jun. 2000 (2 pages).

Jones, Stephen, "Dell Digital Audio Receiver: Digital Upgrade for your Analog Stereo," Reviews Online, Jun. 24, 2000, retrieved from <http://www.reviewsonline.com/articles/961906864.htm>, retrieved on Jun. 18, 2014 (2 pages).

Louderback, Jim, "Affordable Audio Receiver Furnishes Homes With MP3," TechTV Vault, Jun. 28, 2000, retrieved from <http://www.g4tv.com/articles/17923/affordable-audio-receiver-furnishes-homes-with-mp3/>, retrieved on Jul. 10, 2014 (2 pages).

Palm, Inc., "Handbook for the Palm VII Handheld," May 19, 2000 (311 pages). (Document uploaded in 2 different files).

Microsoft Corporation, "Universal Plug and Play Device Architecture," Version 1.0, Jun. 8, 2000 (54 pages).

Higgins et al., Microsoft Corporation, "Presentations at WinHEC 2000," May 2000 (138 pages).

Jo et al., "Synchronized One-to-many Media Streaming with Adaptive Playout Control," Proceedings of SPIE, 2002, vol. 4861, pp. 71-82 (11 pages).

* cited by examiner

FACILITATING THE RESOLUTION OF ADDRESS CONFLICTS IN A NETWORKED MEDIA PLAYBACK SYSTEM

FIELD OF THE DISCLOSURE

The disclosure is related to consumer goods and, more particularly, to methods, systems, products, features, services, and other items directed to media playback or some aspect thereof.

BACKGROUND

Digital music has become readily available due in part to the development of consumer level technology that has allowed people to listen to digital music on a personal audio device. The consumer's increasing preference for digital audio has also resulted in the integration of personal audio devices into PDAs, cellular phones, and other mobile devices. The portability of these mobile devices has enabled people to take the music listening experience with them and outside of the home. People have become able to consume digital music, like digital music files or even Internet radio, in the home through the use of their computer or similar devices. Now there are many different ways to consume digital music, in addition to other digital content including digital video and photos, stimulated in many ways by high-speed Internet access at home, mobile broadband Internet access, and the consumer's hunger for digital media.

Until recently, options for accessing and listening to digital audio in an out-loud setting were severely limited. In 2005, Sonos offered for sale its first digital audio system that enabled people to, among many other things, access virtually unlimited sources of audio via one or more networked connected zone players, dynamically group or ungroup zone players upon command, wirelessly send the audio over a local network amongst zone players, and play the digital audio out loud in synchrony. The Sonos system can be controlled by software applications downloaded to certain network capable, mobile devices and computers.

Given the insatiable appetite of consumers towards digital media, there continues to be a need to develop consumer technology that revolutionizes the way people access and consume digital media.

BRIEF DESCRIPTION OF THE DRAWINGS

Features, aspects, and advantages of the presently disclosed technology may be better understood with regard to the following description, appended claims, and accompanying drawings where:

Figure 1:
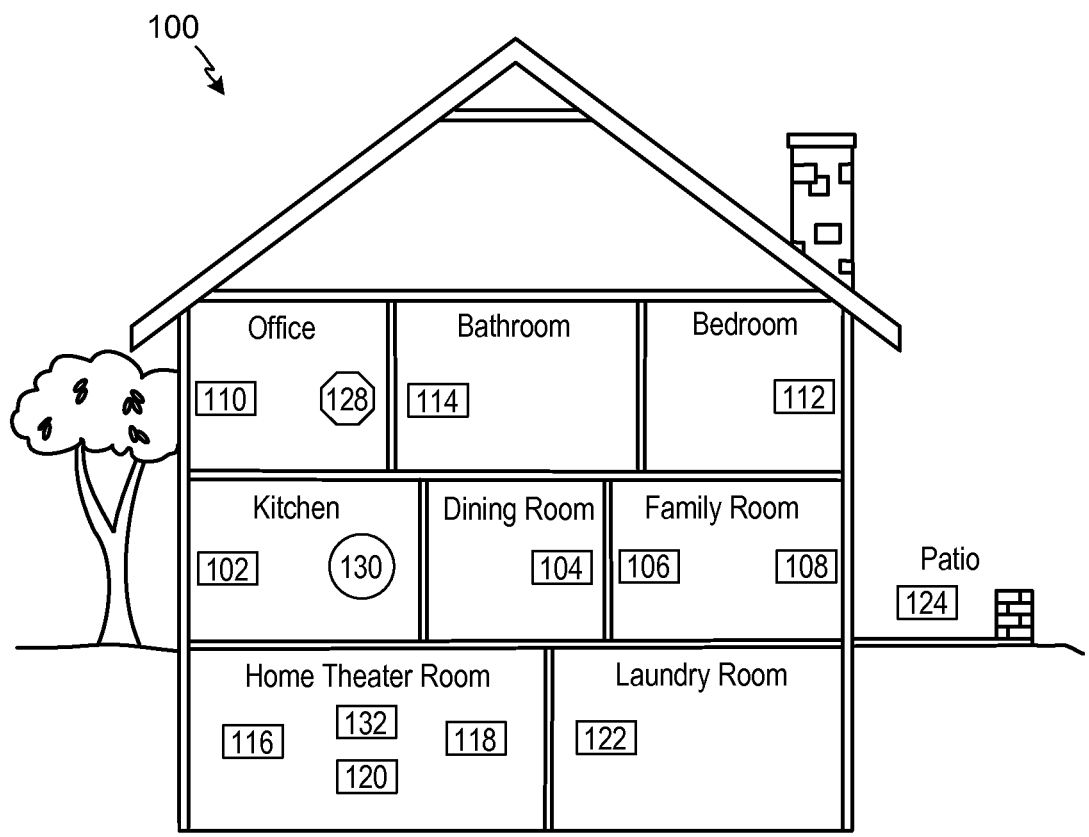
FIG. 1 shows an example configuration in which certain embodiments may be practiced.

In addition, the drawings are for the purpose of illustrating example embodiments, but it is understood that the inventions are not limited to the arrangements and instrumentality shown in the drawings.

DETAILED DESCRIPTION

I. Overview

Embodiments disclosed herein enable resolving conflicts of addresses (such as an Internet Protocol (IP) address) in a networked media playback system. In some embodiments, a network includes an access point and at least a first playback device of a media playback system. In some embodiments, the first playback device in the network monitors data sent to the access point from playback devices in the network. In some embodiments, when data sent to the access point includes a request for a new IP address, the first playback device determines whether the IP address included in the request is the same as the IP address currently assigned to the first playback device. That is, the first playback device monitors the network to determine if any other playback device(s) in the network is requesting an IP address that conflicts with the first playback device IP address. In some embodiments, when the first playback device makes an IP address conflict determination, the first playback device requests a new IP address form the access point to facilitate resolution of the IP address conflict.

In some embodiments, the first playback device monitors the network for events indicative of a status change of the access point. In some embodiments, when the first playback device detects a change in status of the access point, the first playback device obtains a new IP address from the access point. Unlike prior systems, embodiments disclosed herein enable the first playback device to alert other playback device(s) in the network to obtain new IP addresses. To this end, in some embodiments, the first playback device periodically broadcasts probe messages over the network to the other playback devices. When a status change is detected, in some embodiments, the first playback device sets an IP address renew flag in a subsequent probe message. In some embodiments, when another playback device obtains a probe message with an IP address renew flag set, the playback device obtains a new IP address from the access point.

Other embodiments, as those discussed in the following and others as can be appreciated by one having ordinary skill in the art are also possible.

II. Example Operating Environment

Referring now to the drawings, in which like numerals can refer to like parts throughout the figures, FIG. 1 shows an example media system configuration 100 in which one or more embodiments disclosed herein can be practiced or implemented.

By way of illustration, the media system configuration 100 is associated with a home having multiple zones, though the home could have been configured with only one zone. Additionally, one or more zones can be added over time. Each zone may be assigned by a user to a different room or space, such as, for example, an office, bathroom, bedroom, kitchen, dining room, family room, home theater room, utility or laundry room, and patio. A single zone might also include multiple rooms or spaces if so configured. With respect to FIG. 1, one or more of zone players 102-124 are shown in each respective zone. A zone player 102-124, also referred to herein as a playback device, multimedia unit, speaker, player, and so on, provides audio, video, and/or audiovisual output. A controller 130 (e.g., shown in the kitchen for purposes of this illustration) provides control to the media system configuration 100. Controller 130 may be fixed to a zone, or alternatively, mobile such that it can be moved about the zones. The media system configuration 100 may also include more than one controller 130, and additional controllers may be added to the system over time.

The media system configuration 100 illustrates an example whole house media system, though it is understood that the technology described herein is not limited to, among other things, its particular place of application or to an expansive system like a whole house media system configuration 100 of FIG. 1.

a. Example Zone Players

Figure 2A:
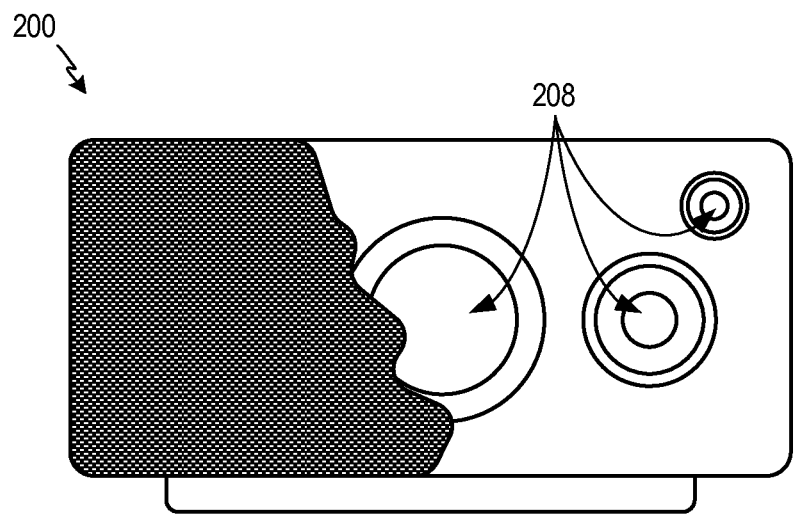
FIG. 2A shows an illustration of an example zone player having a built-in amplifier and transducers.
Figure 2B:
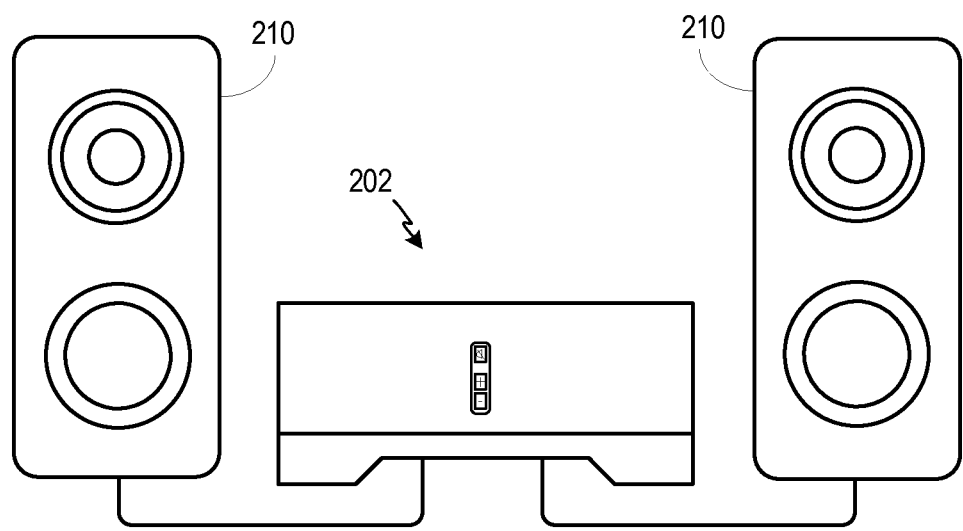
FIG. 2B shows an illustration of an example zone player having a built-in amplifier and connected to external speakers.
Figure 2C:
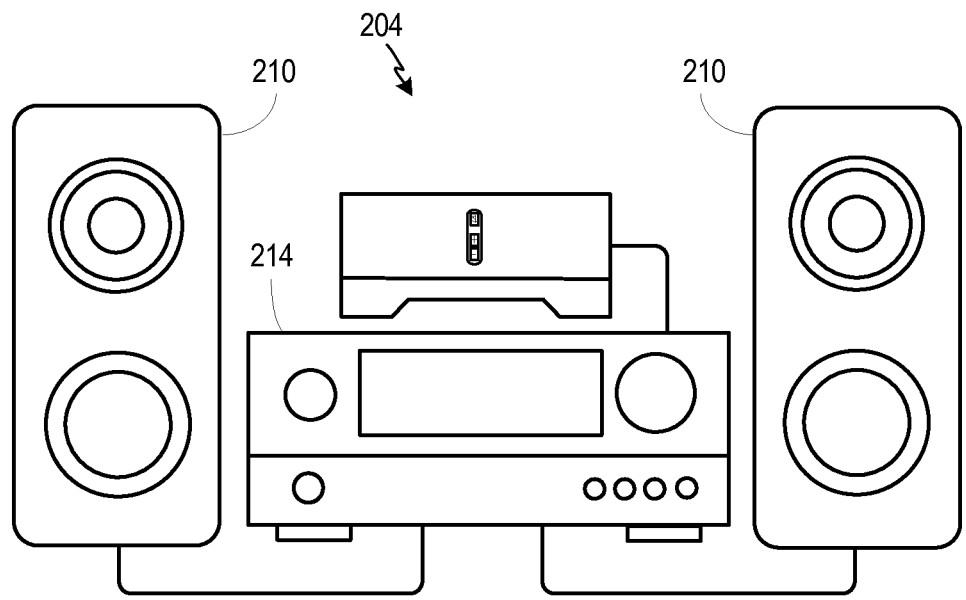
FIG. 2C shows an illustration of an example zone player connected to an A/V receiver and speakers.

FIGS. 2A, 2B, and 2C show example types of zone players. Zone players 200, 202, 204 of FIGS. 2A, 2B, and 2C, respectively, can correspond to any of the zone players 102-124 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, zone players 200, 202, 204 may also be referred to as a "smart speaker," because they contain processing capabilities beyond the reproduction of audio, more of which is described below.

FIG. 2A illustrates zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more acoustic transducers (e.g., speakers). A built-in amplifier is described more below with respect to FIG. 4. A speaker or acoustic transducer can include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 may be dynamically configured to reproduce a subset of full-range sound, such as when zone player 200 is grouped with other zone players to play stereophonic audio, monaural audio, and/or surround audio or when the audio content received by zone player 200 is less than full-range.

FIG. 2B illustrates zone player 202 that includes a built-in amplifier to power a set of detached speakers 210. A detached speaker can include, for example, any type of loudspeaker. Zone player 202 may be configured to power one, two, or more separate loudspeakers. Zone player 202 may be configured to communicate an audio signal (e.g., right and left channel audio or more channels depending on its configuration) to the detached speakers 210 via a wired path.

FIG. 2C illustrates zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 102 to 124 can retrieve audio directly from a source. For example, a particular zone player in a zone or zone group may be assigned to a playback queue (or "queue"). The playback queue contains information corresponding to zero or more audio items for playback by the associated zone or zone group. The playback queue may be stored in memory on a zone player or some other designated device. Each item contained in the playback queue may comprise a uniform resource identifier (URI) or some other identifier that can be used by the zone player(s) to seek out and/or retrieve the audio items from the identified audio source(s). Depending on the item, the audio source might be found on the Internet (e.g., the cloud), locally from another device over a data network 128 (described further below), from the controller 130, stored on the zone player itself, or from an audio source communicating directly to the zone player. In some embodiments, the zone player can reproduce the audio itself (e.g., play the audio), send the audio to another zone player for reproduction, or both where the audio is reproduced by the zone player as well as one or more additional zone players (possibly in synchrony). In some embodiments, the zone player may play a first audio content (or alternatively, may not play the content at all), while sending a second, different audio content to another zone player(s) for reproduction. To the user, each item in a playback queue is represented on an interface of a controller by an element such as a track name, album name, playlist, or some other representation. A user can populate the playback queue with audio items of interest. The user may also modify and clear the playback queue, if so desired.

By way of illustration, SONOS, Inc. of Santa Barbara, Calif. presently offers for sale zone players referred to as a "PLAY:5," "PLAY:3," "PLAYBAR," "CONNECT:AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS product offerings. For example, a zone player may include a wired or wireless headphone. In yet another example, a zone player might include a sound bar for television. In yet another example, a zone player may include or interact with a docking station for an Apple IPOD™ or similar device.

b. Example Controllers

Figure 3:
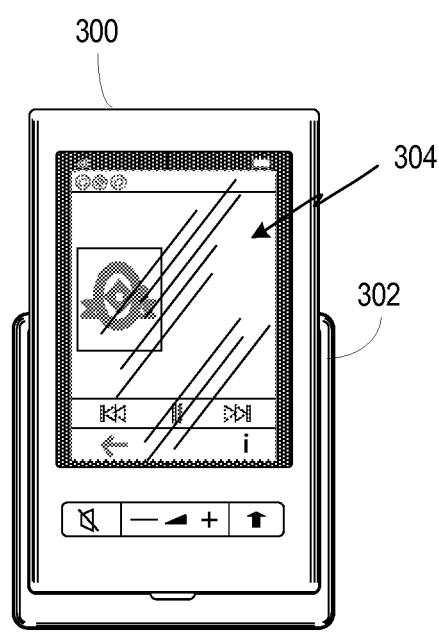
FIG. 3 shows an illustration of an example controller.

FIG. 3 illustrates an example wireless controller 300 in docking station 302. By way of illustration, the controller 300 may correspond to the controlling device 130 of FIG. 1. Docking station 302, if provided or used, may provide power to the controller 300 and additionally may charge a battery of the controller 300. In some embodiments, the controller 300 may be provided with a touch screen 304 that allows a user to interact through touch with the controller 300, for example, to retrieve and navigate a playlist of audio items, control operations of one or more zone players, and provide overall control of the media system configuration 100. In other embodiments, other input mechanisms such as voice control may be used to interact with the controller 300. In certain embodiments, any number of controllers can be used to control the media system configuration 100. In some embodiments, there may be a limit set on the number of controllers that can control the media system configuration 100. The controllers might be wireless like the wireless controller 300 or wired to the data network 128.

In some embodiments, if more than one controller is used in the media system configuration 100 of FIG. 1, each controller may be coordinated to display common content, and may all be dynamically updated to indicate changes made to the media system configuration 100 from a single controller. Coordination can occur, for instance, by a controller periodically requesting a state variable directly or indirectly from one or more of the zone players. For example, the state variable may provide information about the media system configuration 100, such as current zone group configuration, what is playing in one or more zones, volume levels, and other items of interest. The state variable may be passed around on the data network 128 between zone players (and controllers, if so desired) as needed or as often as programmed.

In addition, an application running on any network-enabled portable device, such as an IPHONE™, IPAD™, ANDROID™ powered phone or tablet, or any other smart phone or network-enabled device can be used as the controller 130 in the example media system configuration 100. An application running on a laptop or desktop personal computer (PC) or Mac™ can also be used as the controller 130. Such controllers may connect to the media system configuration 100 through an interface with the data network 128, a zone player, a wireless router, or using some other configured connection path. Example controllers offered by Sonos, Inc. of Santa Barbara, Calif. include a "Controller 200," "SONOS® CONTROL," "SONOS® Controller for IPHONE™," "SONOS® Controller for IPAD™," "SONOS® Controller for ANDROID™," "SONOS® Controller for MAC™ or PC."

c. Example Data Connection

The zone players 102 to 124 of FIG. 1 are coupled directly or indirectly to a data network, such as the data network 128. The example controller 130 may also be coupled directly or indirectly to the data network 128 or individual zone players. The data network 128 is represented by an octagon in the figure to stand out from other representative components. While the data network 128 is shown in a single location, it is understood that such a network is distributed in and around the media system configuration 100. Particularly, the data network 128 can be a wired network, a wireless network, or a combination of both wired and wireless networks. In some embodiments, one or more of the zone players 102-124 are wirelessly coupled to the data network 128 based on a proprietary mesh network. In some embodiments, one or more of the zone players are coupled to the data network 128 using a centralized access point such as a wired or wireless router. In some embodiments, one or more of the zone players 102-124 are coupled via a wire to the data network 128 using Ethernet or similar technology. In addition to the one or more zone players 102-124 connecting to the data network 128, the data network 128 can further allow access to a wide area network, such as the Internet.

In some embodiments, connecting any of the zone players 102-124, or some other connecting device, to a broadband router, can create the data network 128. Other zone players 102-124 can then be added wired or wirelessly to the data network 128. For example, a zone player (e.g., any of zone players 102-124) can be added to the media system configuration 100 by simply pressing a button on the zone player itself (or perform some other action), which enables a connection to be made to the data network 128. The broadband router can be connected to an Internet Service Provider (ISP), for example. The broadband router can be used to form another data network within the media system configuration 100, which can be used in other applications (e.g., web surfing). The data network 128 can also be used in other applications, if so programmed. An example, second network may implement SONOSNET™ protocol, developed by SONOS, Inc. of Santa Barbara. SONOSNET™ represents a secure, AES-encrypted, peer-to-peer wireless mesh network. Alternatively, in certain embodiments, the data network 128 is the same network, such as a traditional wired or wireless network, used for other applications in the household.

d. Example Zone Configurations

A particular zone can contain one or more zone players. For example, the family room of FIG. 1 contains two zone players 106, 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via the controller 130. As such, zones may be created, combined with another zone, removed, and given a specific name (e.g., "Kitchen"), if so desired and programmed to do so with the controller 130. Moreover, in some embodiments, zone configurations may be dynamically changed even after being configured using the controller 130 or some other mechanism.

In some embodiments, a "bonded zone" contains two or more zone players, such as the two zone players 106, 108 in the family room, whereby the two zone players 106, 108 can be configured to play the same audio source in synchrony. In one example, the two zone players 106, 108 can be paired to play two separate sounds in left and right channels, for example. In other words, the stereo effects of a sound can be reproduced or enhanced through the two zone players 106, 108, one for the left sound and the other for the right sound. In another example, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player has additional speaker drivers from which sound can be passed. The consolidated zone player can further be paired with a single zone player or yet another consolidated zone player. Each playback device of a consolidated playback device can be set in a consolidated mode, for example.

In certain embodiments, paired or consolidated zone players (also referred to as "bonded zone players") can play audio in synchrony with other zone players in the same or different zones.

According to some embodiments, one can continue to do any of: group, consolidate, and pair zone players, for example, until a desired configuration is complete. The actions of grouping, consolidation, and pairing are preferably performed through a control interface, such as using the controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

e. Example Audio Sources

In some embodiments, each zone can play from the same audio source as another zone or each zone can play from a different audio source. For example, someone can be grilling on the patio and listening to jazz music via the zone player 124, while someone is preparing food in the kitchen and listening to classical music via the zone player 102. Further, someone can be in the office listening to the same jazz music via the zone player 110 that is playing on the patio via the zone player 124. In some embodiments, the jazz music played via the zone players 110, 124 is played in synchrony. Synchronizing playback amongst zones allows for someone to pass through zones while seamlessly (or substantially seamlessly) listening to the audio. Further, zones can be put into a "party mode" such that all associated zones will play audio in synchrony.

Sources of audio content to be played by zone players 102-124 are numerous. In some embodiments, audio on a zone player itself may be accessed and played. In some embodiments, audio on a controller may be accessed via the data network 128 and played. In some embodiments, music from a personal library stored on a computer or networked-attached storage (NAS) may be accessed via the data network 128 and played. In some embodiments, Internet radio stations, shows, and podcasts may be accessed via the data network 128 and played. Music or cloud services that let a user stream and/or download music and audio content may be accessed via the data network 128 and played. Further, music may be obtained from traditional sources, such as a turntable or CD player, via a line-in connection to a zone player, for example. Audio content may also be accessed using a different protocol, such as AIRPLAY™, which is a wireless technology by Apple, Inc., for example. Audio content received from one or more sources can be shared amongst the zone players 102 to 124 via the data network 128 and/or the controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 is used as a source of audio for the home theater zone players 116, 118, 120, while in other examples audio information from the television 132 may be shared with any of the zone players 102-124 in the media system configuration 100.

III. Example Zone Players

Figure 4:
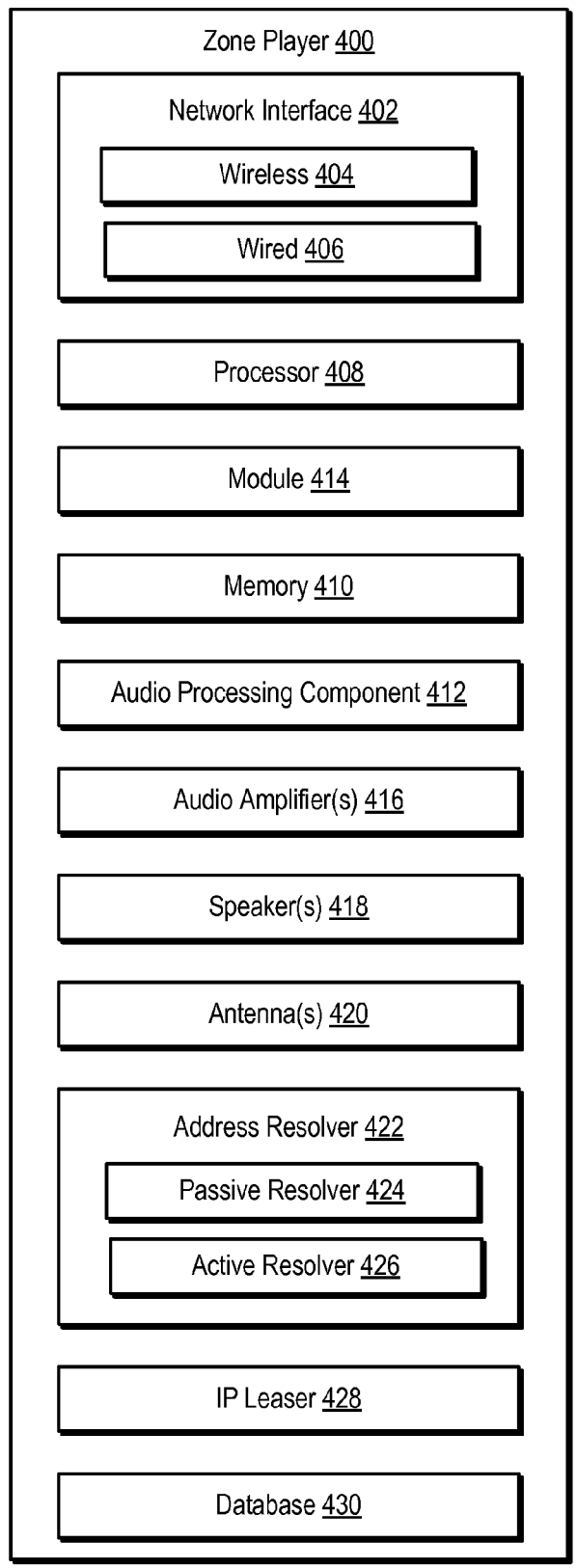
FIG. 4 shows an internal functional block diagram of an example zone player.

Referring now to FIG. 4, there is shown an example block diagram of a zone player 400 in accordance with an embodiment. Zone player 400 includes a network interface 402, a processor 408, a memory 410, an audio processing component 412, one or more modules 414, an audio amplifier 416, a speaker unit 418 coupled to the audio amplifier 416, an address resolver 422, an IP leaser 428 and a database 430. In the illustrated example of FIG. 4, the database 430 includes state information about the zone player 400. For example, the database 430 may include the currently assigned internet protocol (IP) address of the zone player 400, the media access control (MAC) address of the zone player 400, which (if any) other zone players the zone player 400 is in communication with, whether the zone player 400 is to forward messages received at the zone player 400 to other zone players, etc. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, the network interface 402 facilitates a data flow between the zone player 400 and other devices on the data network 128. In some embodiments, in addition to getting audio from another zone player or device on the data network 128, the zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, the network interface 402 can include one or both of a wireless interface 404 and a wired interface 406. The wireless interface 404, also referred to as a radio frequency (RF) interface, provides network interface functions for the zone player 400 to wirelessly communicate with other devices (e.g., other zone player(s), speaker(s), receiver(s), component(s) associated with the data network 128, and so on) in accordance with a communication protocol (e.g., any wireless standard including IEEE 802.11a, 802.11b, 802.11g, 802.11n, 802.11ac, 802.11ad, 802.15, 4G mobile communication standard, and so on). The wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player includes multiple wireless 404 interfaces. In some embodiments, a zone player includes multiple wired 406 interfaces. In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in the memory 410. The memory 410 is data storage that can be loaded with one or more software module(s) 414, which can be executed by the processor 408 to achieve certain tasks. In the illustrated embodiment, the memory 410 is a tangible machine-readable medium storing instructions that can be executed by the processor 408. In some embodiments, a task might be for the zone player 400 to retrieve audio data from another zone player or a device on a network (e.g., using a uniform resource locator (URL) or some other identifier). In some embodiments, a task may be for the zone player 400 to send audio data to another zone player or device on a network. In some embodiments, a task may be for the zone player 400 to synchronize playback of audio with one or more additional zone players. In some embodiments, a task may be to pair the zone player 400 with one or more zone players to create a multi-channel audio environment. Additional or alternative tasks can be achieved via the one or more software module(s) 414 and the processor 408.

The audio processing component 412 can include one or more digital-to-analog converters (DAC), an audio preprocessing component, an audio enhancement component or a digital signal processor, and so on. In some embodiments, the audio processing component 412 may be part of the processor 408. In some embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for playback through speakers 418. In addition, the audio processing component 412 can include circuitry to process analog or digital signals as inputs to play from the zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (e.g., for low frequencies), a mid-range driver (e.g., for middle frequencies), and a tweeter (e.g., for high frequencies), for example. An enclosure can be sealed or ported, for example. Each transducer may be driven by its own individual amplifier.

A commercial example, presently known as the PLAY: 5™, is a zone player with a built-in amplifier and speakers that is capable of retrieving audio directly from the source, such as on the Internet or on the local network, for example. In particular, the PLAY:5™ is a five-amp, five-driver speaker system that includes two tweeters, two mid-range drivers, and one woofer. When playing audio content via the PLAY:5™, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies but from different channels of audio. Audio from Internet radio stations, online music and video services, downloaded music, analog audio inputs, television, DVD, and so on, can be played from the PLAY:5™.

In the illustrated example of FIG. 4, the example zone player 400 includes the example address resolver 422 to facilitate resolution of internet protocol (IP) address conflicts that may occur in a network (e.g., the example data network 128 (FIG. 1)). For example, two or more zone players in the data network 128 may use the same IP address. In the illustrated example, the zone player 400 of FIG. 4 includes a passive resolver 424 and an active resolver 426.

In the illustrated example of FIG. 4, the example passive resolver 424 monitors the data network 128 to determine when a new IP address is assigned to a device (e.g., the zone player 400) in the data network 128. For example, the passive resolver 424 may monitor an access point (e.g., a wired router, a wireless router, etc.) to detect when the access point assigns a device in the data network 128 a new IP address. For example, the passive resolver 424 may "listen" to an input port of the access point, such as a server port (e.g., a user datagram protocol (UDP) server port 67), and identify when the access point obtains a request packet from another zone player. The example passive resolver 424 may then compare an IP address included in the request packet with its own IP address and determine whether an IP address conflict exists. For example, the passive resolver 424 may retrieve the currently assigned IP address of the zone player 400 from the example database 430 and compare it to the IP address included in the request packet. In some embodiments, the passive resolver 424 may initiate the example IP leaser 428 to renew the IP address of the zone player 400 in response to an IP address conflict. In some embodiments, the passive resolver 424 may initiate renewing the IP address of the zone player 400 in response to detecting that the access point obtained a request packet.

In the illustrated example of FIG. 4, the example active resolver 426 monitors the power status of a wired connection to an access point to determine when the zone player 400 is to renew its IP address or to lease a new IP address. For example, the active resolver 426 may monitor the power status (e.g., power ON, power OFF) of the example wired interface 406 of the example network interface 402. In response to detecting a change in power status (e.g., power OFF to power ON), the example active resolver 426 of FIG. 4 initiates the example IP leaser 428 to renew the IP address of the zone player 400 or to lease a new IP address. In some embodiments, the example active resolver 426 propagates the change in power status of the wired interface 406 to (if any) other zone players in the same network as the zone player 400. For example, the active resolver 426 may periodically (e.g., every thirty minutes) and/or aperiodically (e.g., in response to a detected power status change) broadcast probe messages to other zone players in the example data network 128. Probe messages may include a message identifier (e.g., a 16-bit number) identifying the probe message, a zone player identifier (e.g., a MAC address) of the zone player broadcasting the probe message, a forwarding flag indicative of whether a zone player that obtains the probe message is to forward the probe message, and a renew IP flag indicative of whether the zone player that obtains the probe message is to renew its IP address in response to processing the probe message.

In the illustrated example of FIG. 4, the example zone player 400 includes the example IP leaser 428 to renew IP addresses when initiated or to lease a new IP address. The example IP leaser 428 may be initiated when the zone player 400 is rebooted (e.g., the IP leaser 428 is to lease a new IP address), when a currently leased IP address is expiring (e.g., the IP leaser 428 is to renew its currently leased (or assigned) IP address), in response to a message from the passive resolver 424, in response to a message from the active resolver 424, etc. That is, the example IP leaser 428 may be initiated when the zone player 400 is in a bind state, in a renew state and/or in a discover state. In the illustrated example of FIG. 4, the example IP leaser 428 uses the dynamic host configuration protocol (DHCP) when communicating with a host (e.g., a DHCP server such as an access point).

In the illustrated example, the IP leaser 428 generates and unicasts a request message to the access point to renew its IP lease. For example, the IP leaser 428 may send a DHCP_REQUEST packet to the access point when the currently leased IP address lease is expiring and/or when the example address resolver 422 detects the access point rebooting. When the access point accepts the request to renew the IP address, the access point returns an IP address renewal message (e.g., a DHCP_ACK packet) to the IP leaser 428. Otherwise, when the access point denies the request to renew the IP address, the access point returns a negative acknowledgement message (e.g., a DHCP_NACK packet) to the IP leaser 428. For example, when the access point is rebooted, the access point may lose IP address binding information for the one or more zone players leasing IP addresses from the access point. Thus, the access point is unable to renew any IP address lease.

In some embodiments, in response to receiving a negative acknowledgement message from the access point, the IP leaser 428 initiates a new binding process. For example, the IP leaser 428 may broadcast discover message (e.g., a DHCP_DISCOVER packet) on the example data network 128 to identify all available DHCP servers. In some embodiments, the IP leaser 428 obtains an offer message for an IP address lease. For example, a DHCP server (e.g., an access point) may unicast to the IP leaser 428 or broadcast over the data network 128 a response message (e.g., a DHCP_OFFER packet) offering an IP address lease to the IP leaser 428. The offer message may include an IP address and a lease duration. In some embodiments, the example IP leaser 428 responds to the offer message by broadcasting a request message (e.g., a DHCP_REQUEST packet). For example, the IP leaser 428 may request the offered IP address from the access point. The request message includes the IP address offered. For example, the offered IP address may be included in a "Your IP Address" (YIPADDR) field (e.g., an options field) of the request message. In some embodiments, the example IP leaser 428 configures the example network interface 402 with the IP address lease information (e.g., the IP address, the lease duration, the DHCP server accepting the IP address lease, etc.) in response to an acknowledgement message (e.g., a DHCP_ACK packet) obtained by the IP leaser 428. For example, the access point may unicast to the IP leaser 428 or broadcast over the data network 128 the acknowledgement message when the access point accepts the binding request (e.g., request to lease an IP address). The example IP leaser 428 may then store the leased IP address in the example database 430. In some embodiments, the access point determines whether to unicast or broadcast a message based on a broadcast flag included in a message obtained from a client (e.g., the zone player 400). For example, if the broadcast flag (e.g., a bit) is set (e.g., one, on, yes, true, etc.), the access point broadcasts its response message over the data network 128. Otherwise, if the broadcast flag is not set (e.g., zero, off, no, false, etc.), the access point unicasts its response message to the client. In some examples, the access point may send an address resolution protocol (ARP) packet first.

IV. Example Controller

Figure 5:
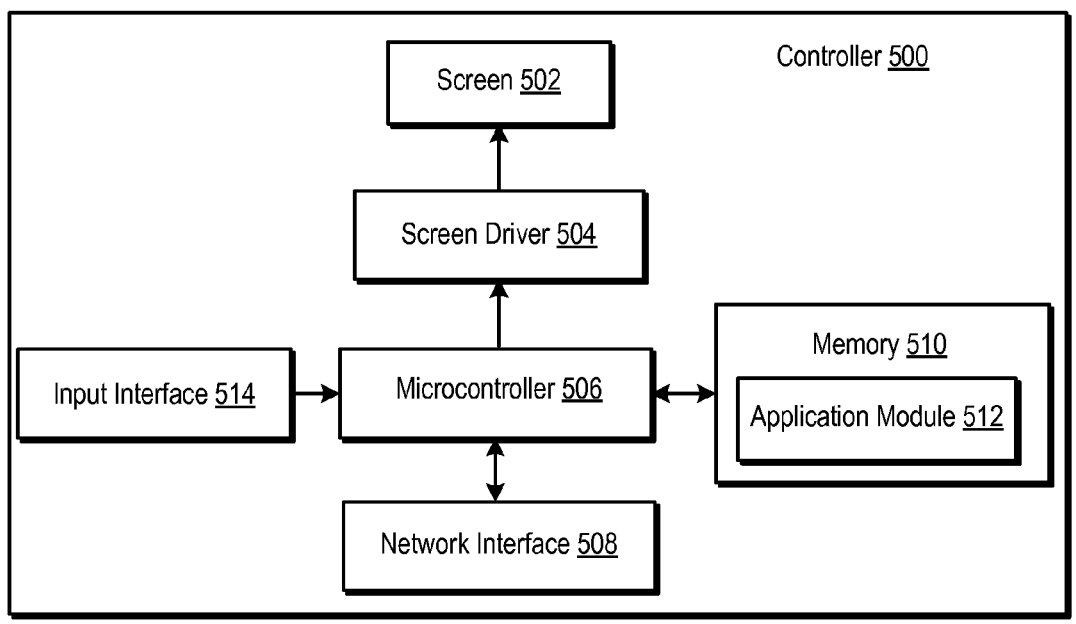
FIG. 5 shows an internal functional block diagram of an example controller.

Referring now to FIG. 5, there is shown an example block diagram for a controller 500, which can correspond to the controlling device 130 in FIG. 1. The controller 500 can be used to facilitate the control of multi-media applications, automation and others in a system. In particular, the controller 500 may be configured to facilitate a selection of a plurality of audio sources available on the network and enable control of one or more zone players (e.g., the zone players 102-124 in FIG. 1) through a wireless or wired network interface 508. According to one embodiment, the wireless communications is based on an industry standard (e.g., infrared, radio, wireless standards including IEEE 802.11a, 802.11b, 802.11g, 802.11n, 802.15, 4G mobile communication standard, and so on). Further, when a particular audio is being accessed via the controller 500 or being played via a zone player, a picture (e.g., album art) or any other data, associated with the audio and/or audio source can be transmitted from a zone player or other electronic device to the controller 500 for display.

The example controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 502 communicates with and is commanded by a screen driver 504 that is controlled by a microcontroller 506 (e.g., a processor). A memory 510 can be loaded with one or more application modules 512 that can be executed by the microcontroller 506 with or without a user input via a user interface 514 to achieve certain tasks. In some embodiments, an application module 512 is configured to facilitate grouping a number of selected zone players into a zone group and synchronizing the zone players for audio playback. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes the network interface 508 that facilitates wired or wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system, and each controller may share common information with another controller, or retrieve the common information from a zone player, if such a zone player stores configuration data (e.g., such as a state variable). Further, a controller can be integrated into a zone player.

It should be noted that other network-enabled devices such as an IPHONE™, IPAD™ or any other smart phone or network-enabled device (e.g., a networked computer such as a PC or MAC™) can also be used as a controller to interact or control zone players in a particular environment. In some embodiments, a software application or upgrade can be downloaded onto a network-enabled device to perform the functions described herein.

In certain embodiments, a user can create a zone group (also referred to as a bonded zone) including at least two zone players from the controller 500. The zone players in the zone group can play audio in a synchronized fashion, such that all of the zone players in the zone group playback an identical audio source or a list of identical audio sources in a synchronized manner such that no (or substantially no) audible delays or hiccups are to be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio playback is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would manually and individually link each zone. The single command may include a mouse click, a double mouse click, a button press, a gesture, or some other programmed or learned action. Other kinds of zone scenes can be programmed or learned by the system over time.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Playback Queue

As discussed above, in some embodiments, a zone player may be assigned to or otherwise associated with a playback queue identifying zero or more media items for playback by the zone player. The media items identified in a playback queue may be represented to the user via an interface on a controller. For instance, the representation may show the user (or users if more than one controller is connected to the system) how the zone player is traversing the playback queue, such as by highlighting the "now playing" item, graying out the previously played item(s), highlighting the to-be-played item(s), and so on.

In some embodiments, a single zone player is assigned to a playback queue. For example, the zone player 114 in the bathroom of FIG. 1 may be linked or assigned to a "Bathroom" playback queue. In an embodiment, the "Bathroom" playback queue might have been established by the system as a result of the user naming the zone player 114 to the bathroom. As such, contents populated and identified in the "Bathroom" playback queue can be played via the zone player 114 (the bathroom zone).

In some embodiments, a zone or zone group is assigned to a playback queue. For example, zone players 106, 108 in the family room of FIG. 1 may be linked or assigned to a "Family room" playback queue. In another example, if family room and dining room zones were grouped, then the new group would be linked or assigned to or otherwise associated with a "family room+dining room" playback queue. In some embodiments, the family room+dining room playback queue may be established based upon the creation of the group. In some embodiments, upon establishment of the new group, the family room+dining room playback queue can automatically include the contents of one (or both) of the playback queues associated with either the family room or dining room or both. In one instance, if the user started with the family room and added the dining room, then the contents of the family room playback queue would become the contents of the family room+dining room playback queue. In another instance, if the user started with the family room and added the dining room, then the family room playback queue would be renamed to the family room+dining room playback queue. If the new group was "ungrouped," then the family room+dining room playback queue may be removed from the system and/or renamed to one of the zones (e.g., renamed to "family room" or "dining room"). After ungrouping, each of the family room and the dining room will be assigned to a separate playback queue. One or more of the zone players in the zone or zone group may store in memory the associated playback queue.

As such, when zones or zone groups are "grouped" or "ungrouped" dynamically by the user via a controller, the system will, in some embodiments, establish or remove/rename playback queues respectively, as each zone or zone group is to be assigned to a playback queue. In other words, the playback queue operates as a container that can be populated with media items for playback by the assigned zone. In some embodiments, the media items identified in a playback queue can be manipulated (e.g., re-arranged, added to, deleted from, and so on).

Figure 6:
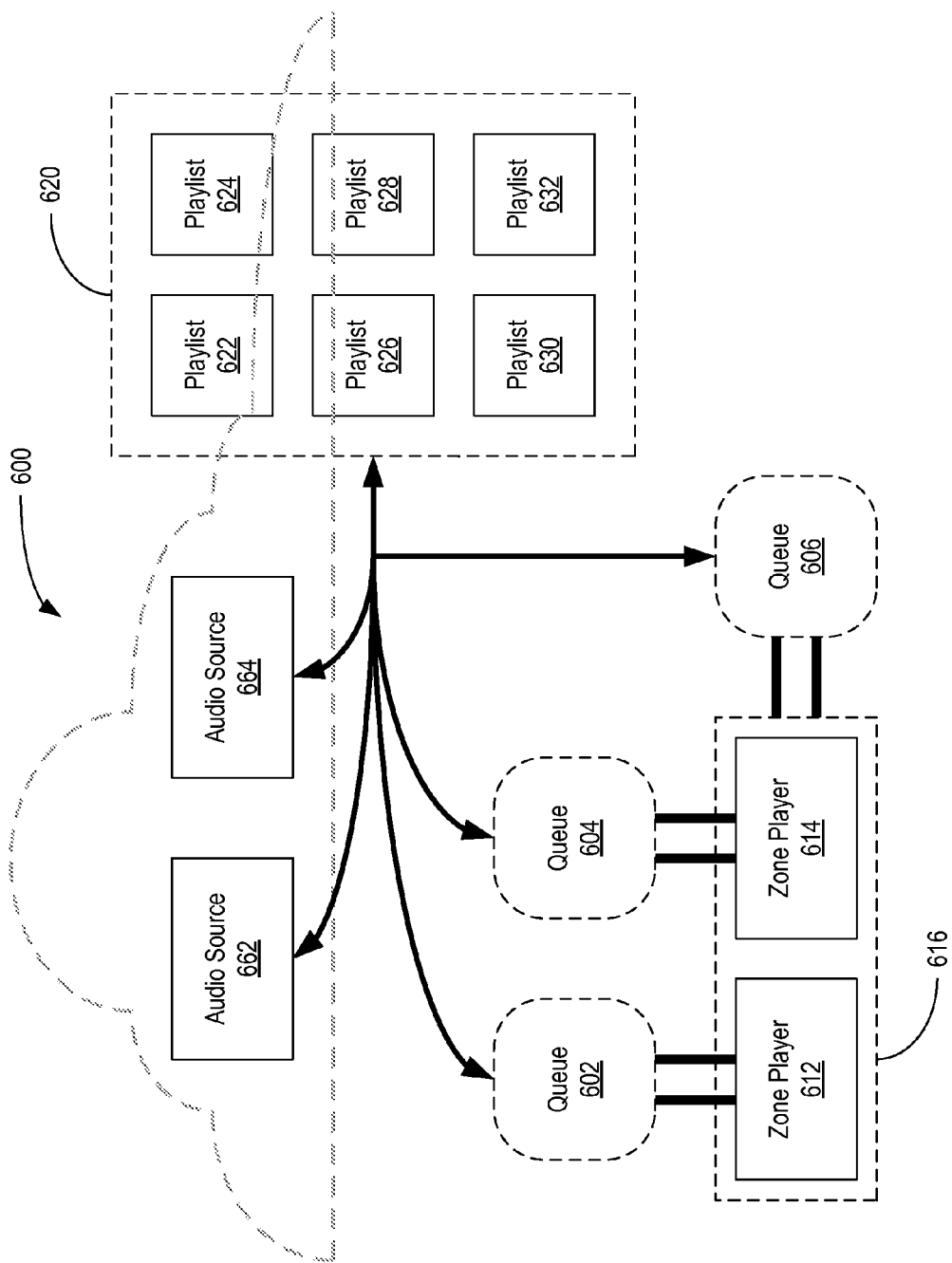
FIG. 6 shows an example network for media content playback.

By way of illustration, FIG. 6 shows an example network 600 for media content playback. As shown, the example network 600 includes example zone players 612, 614, example audio sources 662, 664, and example media items 620. The example media items 620 may include playlist 622, music track 624, favorite Internet radio station 626, playlists 628, 630, and album 632. In one embodiment, the zone players 612, 614 may be any of the zone players shown in FIGS. 1, 2, and 4. For instance, zone players 612, 614 may be the zone players 106, 108 in the Family Room.

In one example, the example audio sources 662, 664, and example media items 620 may be partially stored on a cloud network, discussed more below in connection to FIG. 8. In some cases, the portions of the audio sources 662, 664, and example media items 620 may be stored locally on one or both of the zone players 612, 614. In one embodiment, playlist 622, favorite Internet radio station 626, and playlist 630 may be stored locally, and music track 624, playlist 628, and album 632 may be stored on the cloud network.

Each of the example media items 620 may be a list of media items playable by a zone player(s). In one embodiment, the example media items may be a collection of links or pointers (e.g., URI) to the underlying data for media items that are stored elsewhere, such as the audio sources 662, 664. In another embodiment, the media items may include pointers to media content stored on the local zone player, another zone player over a local network, or a controller device connected to the local network.

As shown, the example network 600 may also include an example queue 602 associated with the zone player 612, and an example queue 604 associated with the zone player 614. The playback queue 606 may be associated with a group, when in existence, comprising the zone player 612 and the zone player 614. The playback queue 606 might comprise a new queue or exist as a renamed version of the queue 602 or 604. In some embodiments, in a group, the zone players 612, 614 would be assigned to the playback queue 606, and the playback queues 602, 604 would not be available at that time. In some embodiments, when the group is no longer in existence, the playback queue 606 is no longer available. Each zone player and each combination of zone players in a network of zone players, such as those shown in FIG. 1 or that of the example zone players 612, 614, and the example combination 616, may be uniquely assigned to a corresponding playback queue.

A playback queue, such as the playback queues 602, 604, 606, may include identification of media content to be played by the corresponding zone player or combination of zone players. As such, media items added to the playback queue are to be played by the corresponding zone player or combination of zone players. The zone player may be configured to play items in the queue according to a specific order (such as an order in which the items were added), in a random order, or in some other order.

The playback queue may include a combination of playlists and other media items added to the queue. In one embodiment, the items in the playback queue 602 to be played by the zone player 612 may include items from the audio sources 662, 664, or any of the media items 622-632. The playback queue 602 may also include items stored locally on the zone player 612, or items accessible from the zone player 614. For instance, the playback queue 602 may include the Internet radio 626 and the album 632 items from the audio source 662, and items stored on the zone player 612.

When a media item is added to the queue via an interface of a controller, a link to the item may be added to the queue. In a case of adding a playlist to the queue, links to the media items in the playlist may be provided to the queue. For example, the playback queue 602 may include pointers from the Internet radio 626 and the album 632, pointers to items on the audio source 662, and pointers to items on the zone player 612. In another case, a link to the playlist, for example, rather than a link to the media items in the playlist may be provided to the queue, and the zone player or combination of zone players may play the media items in the playlist by accessing the media items via the playlist. For example, the album 632 may include pointers to items stored on the audio source 662. Rather than adding links to the items on the audio source 662, a link to the album 632 may be added to the playback queue 602, such that the zone player 612 may play the items on the audio source 662 by accessing the items via pointers in the playlist 632.

In some cases, contents as they exist at a point in time within a playback queue may be stored as a playlist, and subsequently added to the same queue later or added to another queue. For example, contents of the playback queue 602, at a particular point in time, may be saved as a playlist, stored locally on the zone player 612 and/or on the cloud network. The saved playlist may then be added to the playback queue 604 to be played by the zone player 614.

VI. Example Ad-Hoc Network

Figure 7:
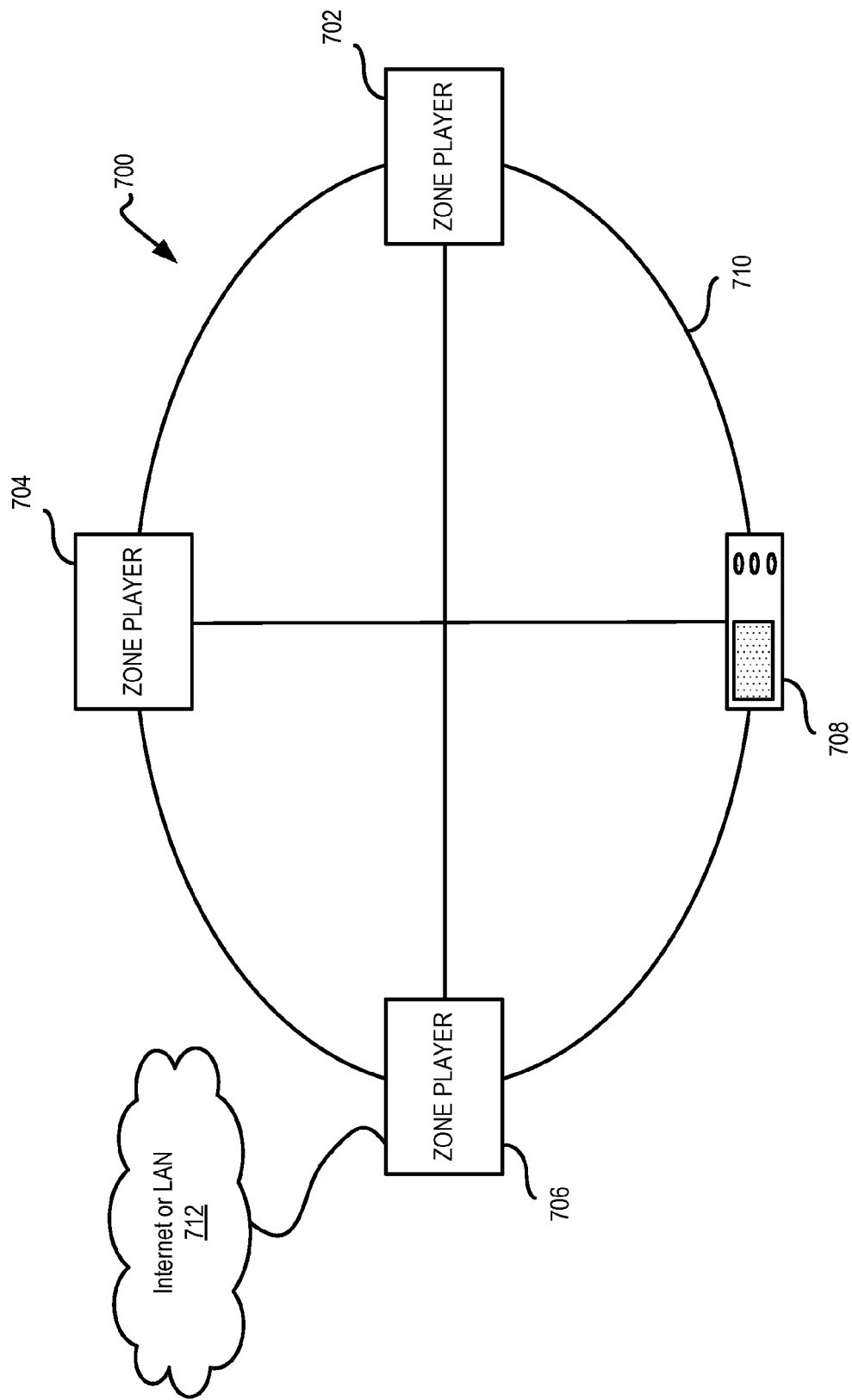
FIG. 7 shows an example ad-hoc playback network.

Particular examples are now provided in connection with FIG. 7 to describe, for purposes of illustration, certain embodiments to provide and facilitate connection to a playback network. FIG. 7 shows that there are three zone players 702, 704 and 706 and a controller 708 that form a network branch that is also referred to as an Ad-Hoc network 710. The network 710 may be wireless, wired, or a combination of wired and wireless technologies. In general, an Ad-Hoc (or "spontaneous") network is a local area network or other small network in which there is generally no one access point for all traffic. With an established Ad-Hoc network 710, the devices 702, 704, 706, 708 can all communicate with each other in a "peer-to-peer" style of communication, for example. Furthermore, devices may join and/or leave from the network 710, and the network 710 will automatically reconfigure itself without needing the user to reconfigure the network 710. While an Ad-Hoc network is referenced in FIG. 7, it is understood that a playback network may be based on a type of network that is completely or partially different from an Ad-Hoc network.

Using the Ad-Hoc network 710, the devices 702, 704, 706, 708 can share or exchange one or more audio sources and be dynamically grouped (or ungrouped) to play the same or different audio sources. For example, the devices 702, 704 are grouped to playback one piece of music, and at the same time, the device 706 plays back another piece of music. In other words, the devices 702, 704, 706, 708, as shown in FIG. 7, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service. An instance of a HOUSEHOLD is identified with a household 710 (or household identifier), though a HOUSEHOLD may be identified with a different area or place.

In certain embodiments, a household identifier (HHID) is a short string or an identifier that is computer-generated to help ensure that it is unique. Accordingly, the network 710 can be characterized by a unique HHID and a unique set of configuration variables or parameters, such as channels (e.g., respective frequency bands), service set identifier (SSID) (a sequence of alphanumeric characters as a name of a wireless network), and WEP keys (wired equivalent privacy) or other security keys. In certain embodiments, SSID is set to be the same as HHID.

In certain embodiments, each HOUSEHOLD includes two types of network nodes: a control point (CP) and a zone player (ZP). The control point controls an overall network setup process and sequencing, including an automatic generation of required network parameters (e.g., security keys). In an embodiment, the CP also provides the user with a HOUSEHOLD configuration user interface. The CP function can be provided by a computer running a CP application module, or by a handheld controller (e.g., the controller 708) also running a CP application module, for example. The zone player is any other device on the network that is placed to participate in the automatic configuration process. The ZP, as a notation used herein, includes the controller 708 or a computing device, for example. In some embodiments, the functionality, or certain parts of the functionality, in both the CP and the ZP are combined at a single node (e.g., a ZP contains a CP or vice-versa).

In certain embodiments, configuration of a HOUSEHOLD involves multiple CPs and ZPs that rendezvous and establish a known configuration such that they can use a standard networking protocol (e.g., IP over Wired or Wireless Ethernet) for communication. In an embodiment, two types of networks/protocols are employed: Ethernet 802.3 and Wireless 802.11g. Interconnections between a CP and a ZP can use either of the networks/protocols. A device in the system as a member of a HOUSEHOLD can connect to both networks simultaneously.

In an environment that has both networks in use, it is assumed that at least one device in a system is connected to both as a bridging device, thus providing bridging services between wired/wireless networks for others. The zone player 706 in FIG. 7 is shown to be connected to both networks, for example. The connectivity to the network 712 is based on Ethernet and/or Wireless, while the connectivity to other devices 702, 704, 708 is based on Wireless and Ethernet if so desired.

It is understood, however, that in some embodiments each zone player 706, 704, 702 may access the Internet when retrieving media from the cloud (e.g., the Internet) via the bridging device. For example, the zone player 702 may contain a uniform resource locator (URL) that specifies an address to a particular audio track in the cloud. Using the URL, the zone player 702 may retrieve the audio track from the cloud, and ultimately play the audio out of one or more zone players.

VII. Another Example System Configuration

Figure 8:
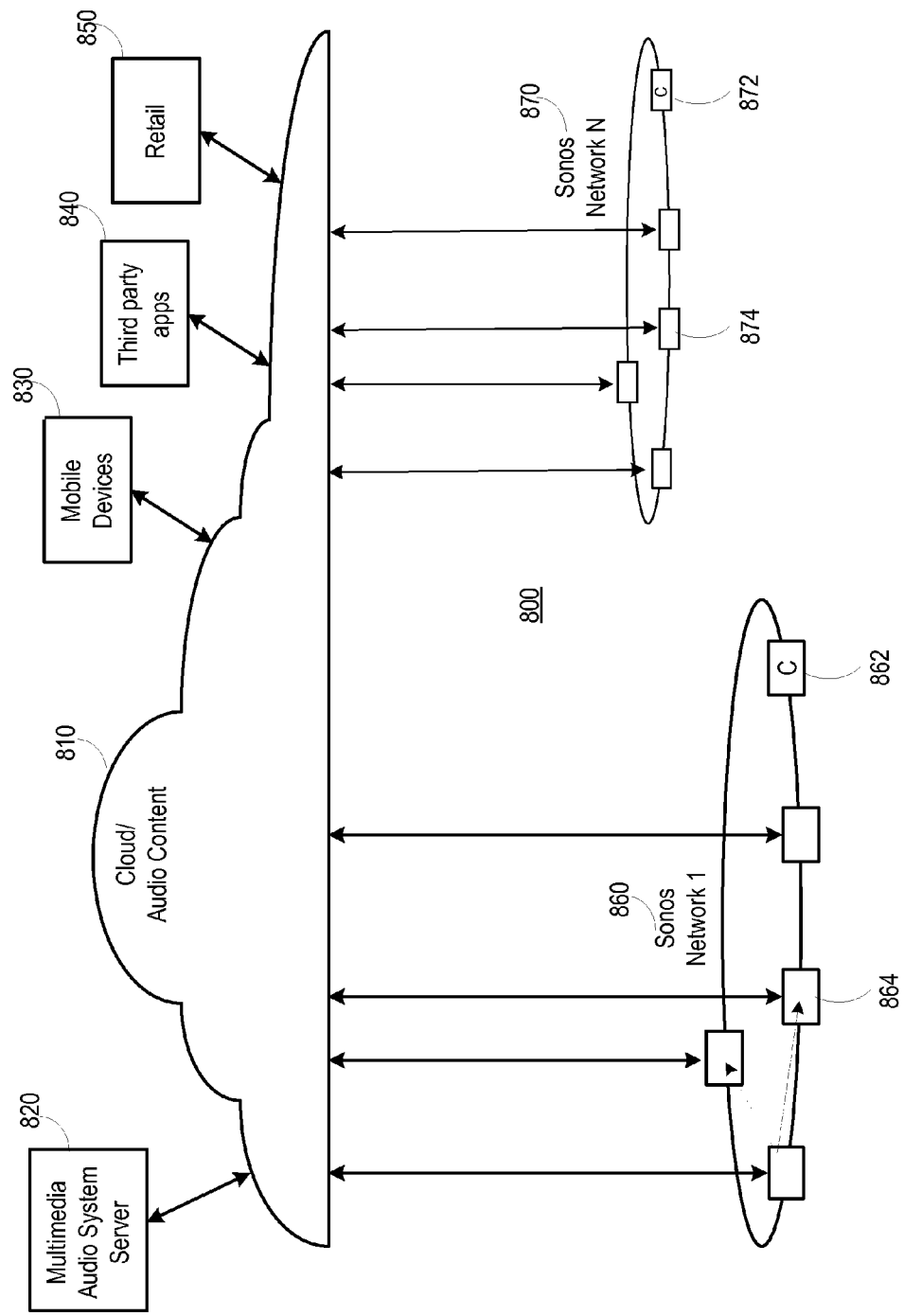
FIG. 8 shows a system including a plurality of networks including a cloud-based network and at least one local playback network.

FIG. 8 shows a system 800 including a plurality of interconnected networks including a cloud-based network and at least one local playback network. A local playback network includes a plurality of playback devices or players, though it is understood that the playback network may contain only one playback device. In certain embodiments, each player has an ability to retrieve its content for playback. Control and content retrieval can be distributed or centralized, for example. Input can include streaming content provider input, third party application input, mobile device input, user input, and/or other playback network input into the cloud for local distribution and playback.

As illustrated by the example system 800 of FIG. 8, a plurality of content providers 820-850 can be connected to one or more local playback networks 860-870 via a cloud and/or other network 810. Using the cloud 810, a multimedia audio system server 820 (e.g., Sonos™), a mobile device 830, a third party application 840, a content provider 850 and so on can provide multimedia content (requested or otherwise) to local playback networks 860, 870. Within each local playback network 860, 870, a controller 862, 872 and a playback device 864, 874 can be used to playback audio content.

VIII. Example Resolution of Internet Protocol Address Conflicts

During operation, an access point (e.g., a wired and/or wireless router) enables playback devices such as zone players on a network to communicate on that network. The access point maintains an IP address configuration in a data structure such as a lookup table, a list, a document, etc. For example, the access point may identify an IP address to lease (e.g., assign) to a device on the network based on available IP addresses included in the IP address configuration. However, in some embodiments, when the access point is rebooted (or changes to the power ON state from the power OFF state), the IP address configuration stored in the data structure may be lost. For example, the IP address configuration may be stored in temporary memory that resets when power is removed to the memory.

In certain instances, such as, for example, those described above, an IP address conflict may develop in a network, whereby, for example, more than one device on the network may use the same IP address. Duplicate IP addresses may occur when, for example, the access point reboots. Duplicate IP address resolution is not defined for network devices that are not in direct communication (e.g., directly connected via wired or wireless interface) to the access point. For example, the access point may be unaware that a first device is assigned a first IP address when a second device requests a lease for the first IP address because the IP address configuration (e.g., data structure including available IP addresses) was lost when the access point was rebooted. Accordingly, embodiments disclosed herein enable resolving IP address conflicts in a network.

Figure 9:
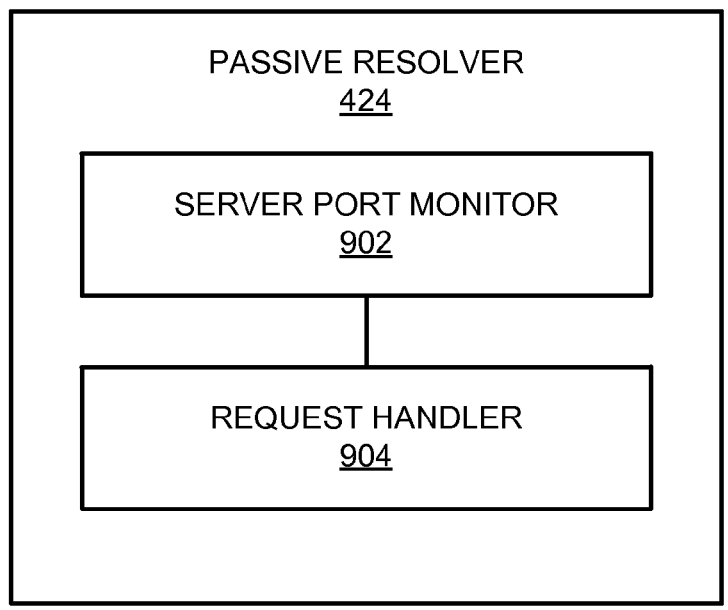
FIG. 9 shows an internal functional block diagram of the example passive resolver of FIG. 4.

FIG. 9 illustrates an example block diagram of the example passive resolver 424 of the zone player depicted in FIG. 4. The example passive resolver 424 of FIG. 9 monitors a data network to detect IP address lease requests from other device(s) communicating on the network. For example, the passive resolver 424 may identify when another zone player (e.g., the example zone player 400 (FIG. 4), a laptop, a smart phone, etc. requests an IP address (either to renew its IP address or to bind to a new IP address) on a data network, such as the data network 128 (FIG. 1), the ad-hoc network 710 (FIG. 7), the Sonos Network 1 860 and/or Sonos Network N 870 (FIG. 8). The example passive resolver 424 may then facilitate resolution of duplicate IP addresses by, for example, requesting a new (or renewing an) IP address. The example passive resolver 424 of FIG. 9 includes an example server port monitor 902 and an example request handler 904.

In the illustrated example of FIG. 9, the example passive resolver 424 includes the example server port monitor 902 to monitor messages (e.g., DHCP messages or packets) sent to a host (e.g., an access point) on a network such as the example data network 128 (FIG. 1). For example, the server port monitor 902 may monitor user datagram protocol (UDP) server port (67) and UDP client port (68). The UDP server port (67) is a destination port to send data to a server. That is, messages that communicate via the UDP server port (67) correspond to messages sent to a host device such as an access point from a client device such as a playback device. In contrast, the UDP client port (68) is a destination port for data sent to a client. That is, messages that communicate via the UDP client port (68) correspond to messages obtained by a client device such as the zone player 400 (FIG. 4) from a host device. Thus, the example server port monitor 902 enables the example passive resolver 424 to detect IP address lease request messages sent from another device on the network to an access point on the network. In some embodiments, the example server port monitor 902 monitors the UDP server port (67) while the zone player is in a bind state (e.g., the client device is connected to a host device). In some embodiments, the example server port monitor 902 monitors the UDP server port (67) while the zone player is in a renew state (e.g., trying to renew the currently assigned IP address) or in the discover state (e.g., when the client device is initiating a new binding process).

In the illustrated example of FIG. 9, the example passive resolver 424 includes the example request handler 904 to determine whether the IP address included in an IP address lease request message is the same as the IP address leased (e.g., currently assigned) to the zone player 400. For example, request handler 904 may retrieve the zone player 400 IP address from the example database 430 (FIG. 4) and compare it to the IP address included in the "YIPADDR" (e.g., Your IP Address) options field of the request message. In some embodiments, if the IP addresses do not match (e.g., are not the same or equivalent), the example request handler 904 discards the IP address lease request message. Otherwise, in some embodiments, if the IP addresses do match (e.g., are the same or equivalent), the example request handler 904 initiates the example IP leaser 428 (FIG. 4) to obtain a new IP address for the zone player 400. As discussed above in connection with the IP leaser 428, when the IP leaser 428 requests to renew an IP address, the IP leaser receives a negative acknowledgement message (e.g., a DHCP_NACK packet) because the IP address included in the renew request message is the same as the IP address of another device on the network.

In some embodiments, the example passive resolver 424 may not include the example request handler 904. That is, in some embodiments, when the example server port monitor 902 detects an IP address lease request, the example server port monitor 902 may initiate the example IP leaser 428 regardless of whether the IP address included in the request message is the same as the IP address of the zone player 400.

Figure 10:
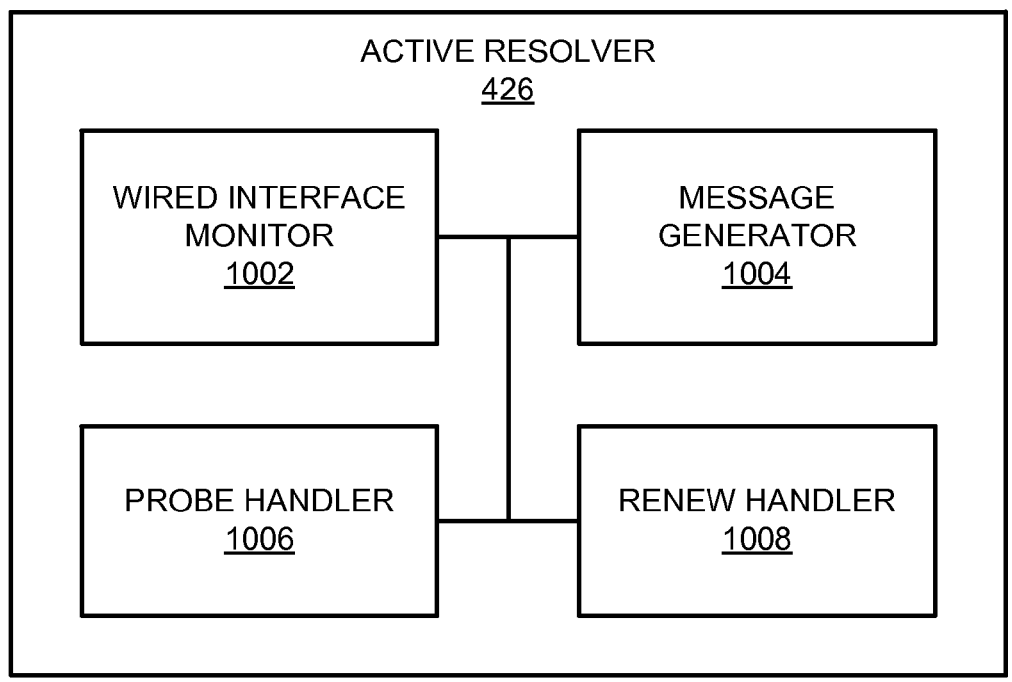
FIG. 10 shows an internal functional block diagram of the example active resolver of FIG. 4.

FIG. 10 illustrates an example block diagram of the example active resolver 426 of FIG. 4. The example active resolver 426 of FIG. 10 monitors the power status of a wired connection to an access point in a network. For example, the active resolver 426 may monitor the wired interface 406 (FIG. 4) to detect a change in the power status. In some embodiments, a change in power status of the wired interface 406 is indicative of a change in power status (e.g., a reboot) of an access point that is in communication with the wired interface 406. In some embodiments, the active resolver 426 may then request a new IP address (or request to renew the IP address already assigned (e.g., leased) to the device) and cause other devices in communication with the active resolver 426 and/or the access point to request new IP addresses (or request to renew the existing IP addresses). The example active resolver 426 of FIG. 10 includes an example wired interface monitor 1002, an example message generator 1004, an example probe handler 1006 and an example renew handler 1008.

In the illustrated example of FIG. 10, the example wired interface monitor 1002 monitors power status changes in the wired interface of the zone player 400 (FIG. 4). For example, the wired interface monitor 1002 may detect changes in the Ethernet status (e.g., "eth0") of the wired interface 406. In some embodiments, the eth0 is a binary status bit that indicates that the Ethernet status is either ON or OFF. In some embodiments, when the wired interface monitor 1002 detects a change in the eth0 from the power OFF state to the power ON state, the example wired interface monitor 1002 initiates the example IP leaser 428 (FIG. 4) to initiate an IP address renew request or a new binding process. For example, the change in the eth0 may indicate that the access point was rebooted. Accordingly, the example active resolver 426 initiates the example IP leaser 428 to cause the access point to update available IP addresses in the IP address configuration of the data network.

In the illustrated example of FIG. 10, the example message generator 1004 generates probe messages that are broadcast by zone players on a data network, such as the data network 128 (FIG. 1), the ad-hoc network 710 (FIG. 7), the Sonos Network 1 860 and/or Sonos Network N 870 (FIG. 8). Probe messages may include a message identifier (e.g., a 16-bit number) identifying the probe message, a zone player identifier (e.g., a MAC address) of the zone player broadcasting the probe message, a forwarding flag indicative of whether a zone player that obtains the probe message is to forward the probe message, and a renew IP flag indicative of whether the zone player that obtains the probe message is to renew its IP address in response to processing the probe message. In some embodiments, the probe messages are broadcast periodically by the zone players on the data network. For example, a probe message may be sent every 500 milliseconds. In some embodiments, the probe messages are broadcast aperiodically by the zone players on the data network. For example, a zone player may send a probe message in response to a detected change in the eth0 status.

In some embodiments, the example message generator 1004 of FIG. 10 generates a probe message with a new message identifier to identify different probe messages. For example, the message identifier may be a locally generated sequence number such as a 16-bit number. In some embodiments, the active resolver 426 may use the message identifier to determine whether the probe message was previously obtained. For example, a probe message may be forwarded from one zone player on the data network to another zone player until the probe message is obtained by a zone player for a second time. In the illustrated example, the example message generator 1004 of FIG. 10 stores the new message identifier in the example database 430 (FIG. 4). In some embodiments, the example message generator 1004 of FIG. 10 includes a MAC address of the zone player that generates a probe message in the probe message.

In the illustrated example, the example message generator 1004 of FIG. 10 updates the status of a renew IP flag included in the probe message in response to determinations made by the example wired interface monitor 1002. For example, when the wired interface monitor 1002 detects a change in the power status of the eth0, the example message generator 1004 may set (e.g., one, yes, on, true, etc.) the renew IP flag. When the example wired interface monitor 1002 does not detect a change in the power status of the eth0, the example message generator may reset (e.g., zero, no, off, false, etc.) the renew IP flag. The status of the renew IP flag may be used by the example probe handler 1006 to determine whether the active resolver 426 is to initiate the example IP leaser 428.

In the illustrated example of FIG. 10, the example active resolver 426 includes the example probe handler 1006 to process probe messages obtained by the active resolver 426 from another zone player. For example, the probe handler 1006 may periodically and/or aperiodically obtain a probe message from another zone player on a data network, such as the data network 128 (FIG. 1), the ad-hoc network 710 (FIG. 7), the Sonos Network 1 860 and/or Sonos Network N 870 (FIG. 8). In the illustrated example, the probe handler 1006 of FIG. 10 checks the status of the renew IP flag of the probe message. In some embodiments, when the renew IP flag is set (e.g., one, yes, on, true, etc.), the example probe handler 1006 outputs a message indicative of the new probe message to the example renew handler 1008.

In some embodiments, the example probe handler 1006 may determine whether the renew IP flag of the probe message is to be reset in a probe message based on a time-to-live for the renew IP flag. For example, a probe message may include a timestamp indicative of when the example message generator 1004 generated the probe message. In some such embodiments, when the example probe handler 1006 obtains a probe message with a renew IP flag that is set, the example probe handler 1006 may determine whether the time-to-live of the renew IP flag expired based on the timestamp included in the probe message. For example, the time-to-live for a set renew IP flag may be equal to the round trip propagation delay through the network. Thus, the example probe handler 1006 may check whether the set renew IP flag time-to-live (e.g., the difference between the time the probe message is obtained and the time the probe message is generated) is less than the round trip propagation delay. Accordingly, the example probe handler 1006 forwards the probe message to the example renew handler 1008 when the set renew IP flag time-to-live has not expired, and discards the probe message if the time-to-live has expired.

In some embodiments, the example probe handler 1006 may also check the status of the forwarding flag in the probe message to determine whether the probe message is to be forwarded to other zone players on the data network. For example, the probe handler 1006 may forward the probe message to the example message generator 1004 when the forwarding flag is set (e.g., one, yes, on, true, etc.) and may discard the probe message when the forwarding flag is reset (e.g., zero, no, off, false, etc.).

In the illustrated example of FIG. 10, the example active resolver 426 includes the example renew handler 1008 to determine whether the obtained probe message is a new probe message or a previously obtained probe message. For example, the renew handler 1008 may retrieve previously obtained message identifiers from the example database 430 to compare to the message identifier included in the probe message. If the probe message is a new probe message (e.g., not previously obtained), the example renew handler 1008 initiates the example IP leaser 428 (FIG. 4). Otherwise, the example renew handler 1008 may discard the probe message.

In some embodiments, the renew handler 1008 may use hysteresis to avoid initiating the example IP leaser 428 multiple times to request renewing the IP address of the zone player. For example, the renew handler 1008 may include a timer that starts each time the renew handler 1008 initiates the example IP leaser 428. If another request to renew the IP address is obtained before the timer expires, the renew handler 1008 may discard the probe message. This may be useful when, for example, multiple eth0 status events are detected by the example wired interface monitor 1002. For example, a bad power connection may cause unwanted rapid eth0 status changes.

Figure 11:
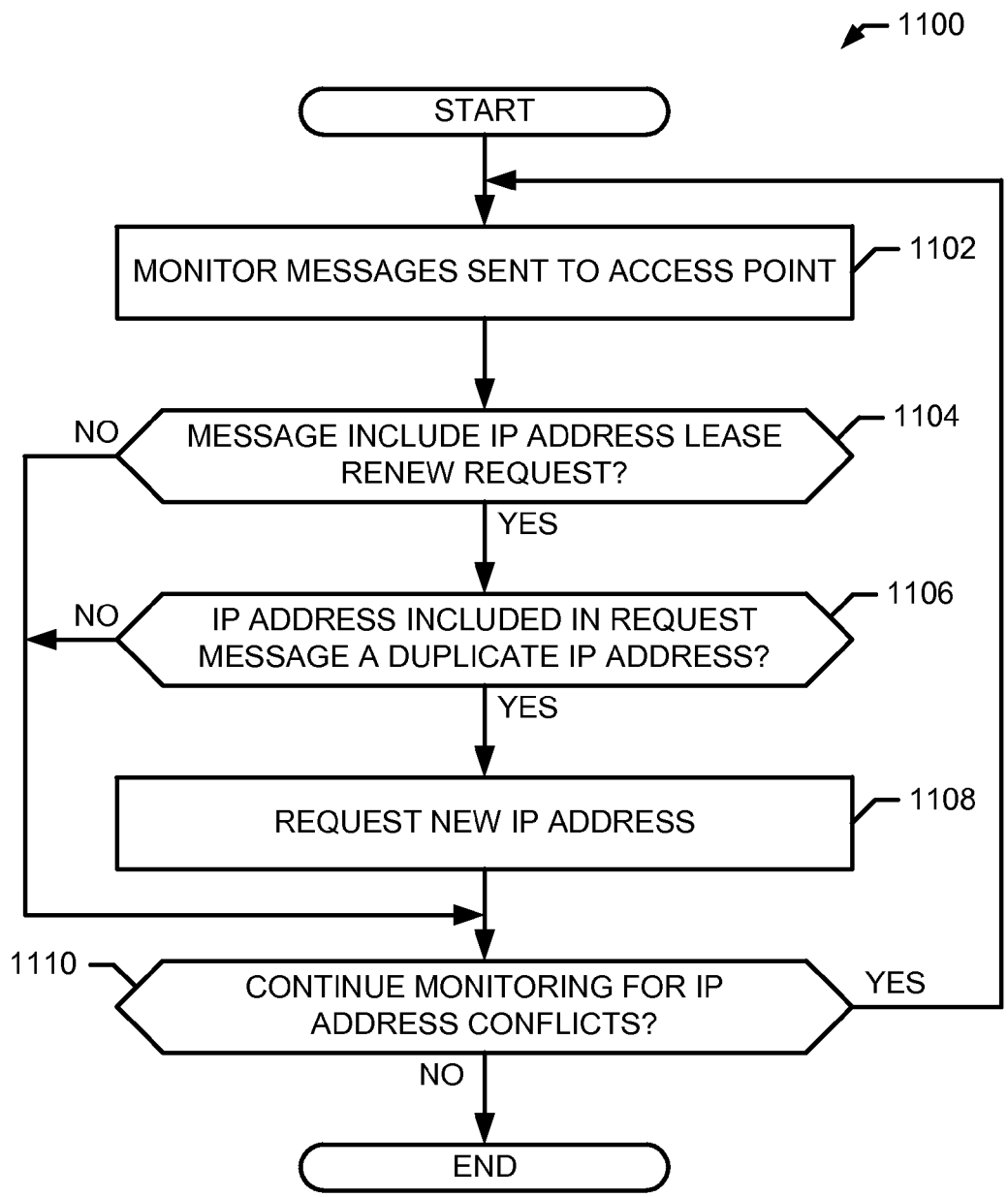
FIG. 11 shows an illustrative flowchart for an example method for resolving IP address conflicts.

FIG. 11 shows an illustrative flowchart for an example method 1100 to facilitate resolution of IP address conflicts, in accordance with at least some embodiments described herein. For example, the example method 1100 may use the example passive resolver 424 to facilitate resolution of IP address conflicts. The example method 1100 of FIG. 11 begins at block 1102 when the example passive resolver 424 (FIGS. 4 and/or 9) monitors messages sent to an access point on a data network, such as the data network 128 (FIG. 1), the ad-hoc network 710 (FIG. 7), the Sonos Network 1 860 and/or Sonos Network N 870 (FIG. 8). For example, the server port monitor 902 (FIG. 9) may "listen" to messages sent to the UDP server port (67) from other devices (e.g., one or more zone players, one or more laptops, one or more smart phones, etc.). At block 1104, the example passive resolver 424 determines whether a message sent to the access point includes an IP address lease renew request. For example, the server port monitor 902 checks whether the message sent to the UDP server port (67) includes a DHCP_REQUEST packet. If the example server port monitor 902 determines that the message does not include an IP address lease renew request at block 1104, then control proceeds to block 1110 to determine whether to continue monitoring for IP address conflicts.

Otherwise, if the example server port monitor 902 determines that the message sent to the UDP server port (67) does include an IP address lease renew request at block 1104, then, at block 1106, the example passive resolver 424 determines whether the IP address included in the request message is a duplicate IP address. For example, the request handler 904 (FIG. 9) may retrieve the IP address of the zone player (e.g., the example zone player 400) from the example database 430 (FIG. 4) to compare to the IP address included in the IP address lease renew request (e.g., the value of the "YIPADDR" options field of the request). If the example request handler 904 determines the request message is not a duplicate IP address at block 1106, then control proceeds to block 1110 to determine whether to continue monitoring for IP address conflicts.

Otherwise, if the example request handler 904 determines the request message is a duplicate IP address at block 1106, then, at block 1108, the example passive resolver 424 requests a new IP address. For example, the request handler 904 may initiate the example IP leaser 428 (FIG. 4) to request an IP address lease renewal. At block 1110, the example passive resolver 424 determines whether to continue monitoring for IP address conflicts. If the passive resolver 424 determines to continue monitoring for IP address conflicts, control returns to block 1102 to monitor messages sent to the access point. Otherwise, if, at block 1110, the passive resolver 424 determines not to continue monitoring for IP address conflicts (e.g., due to an application/process shutdown event, a hardware shutdown event, etc.), the example method of FIG. 11 ends.

Figure 12A:
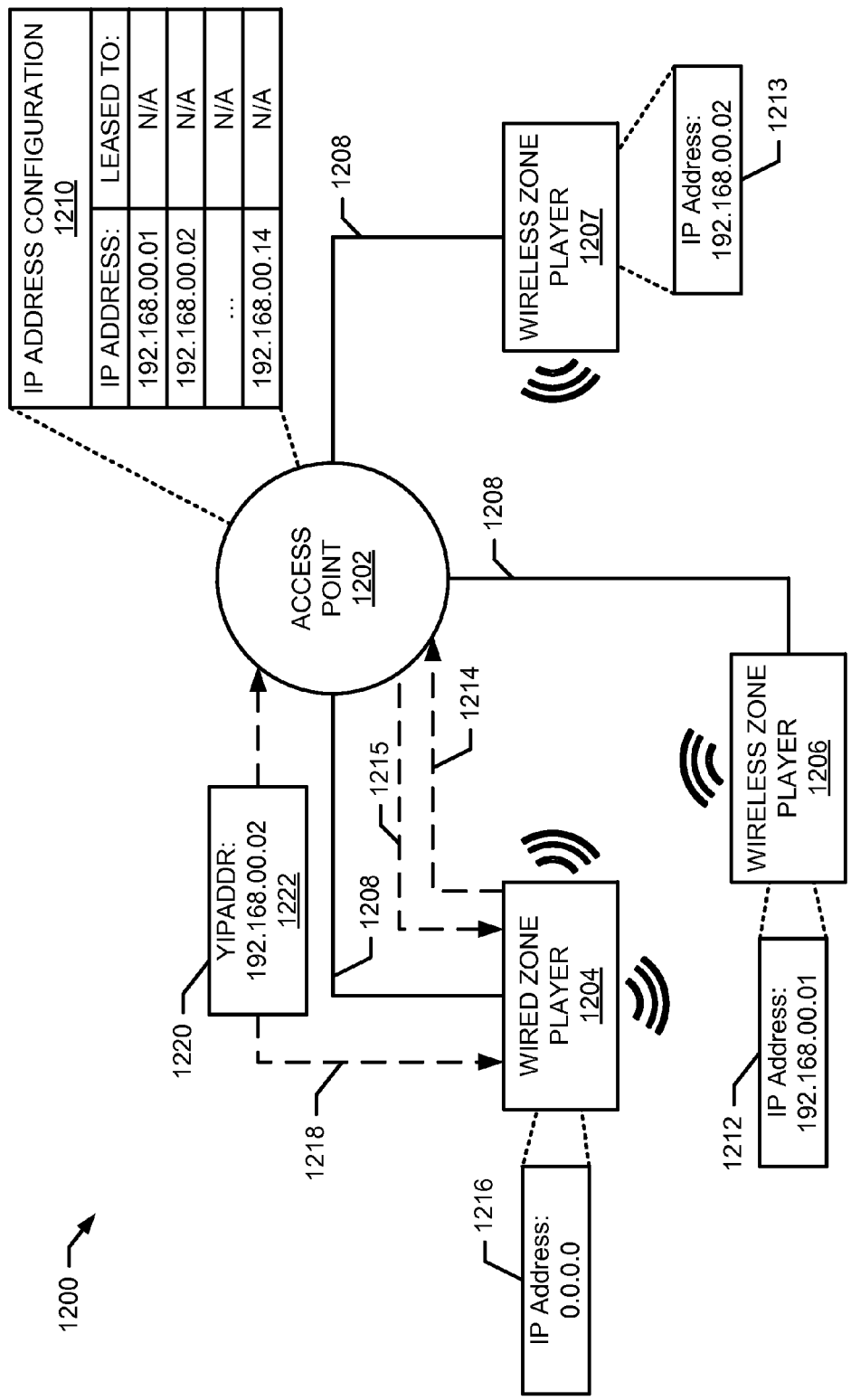
FIGS. 12a and 12b show illustrative flow paths for resolving IP address conflicts in an example environment.
Figure 12B:
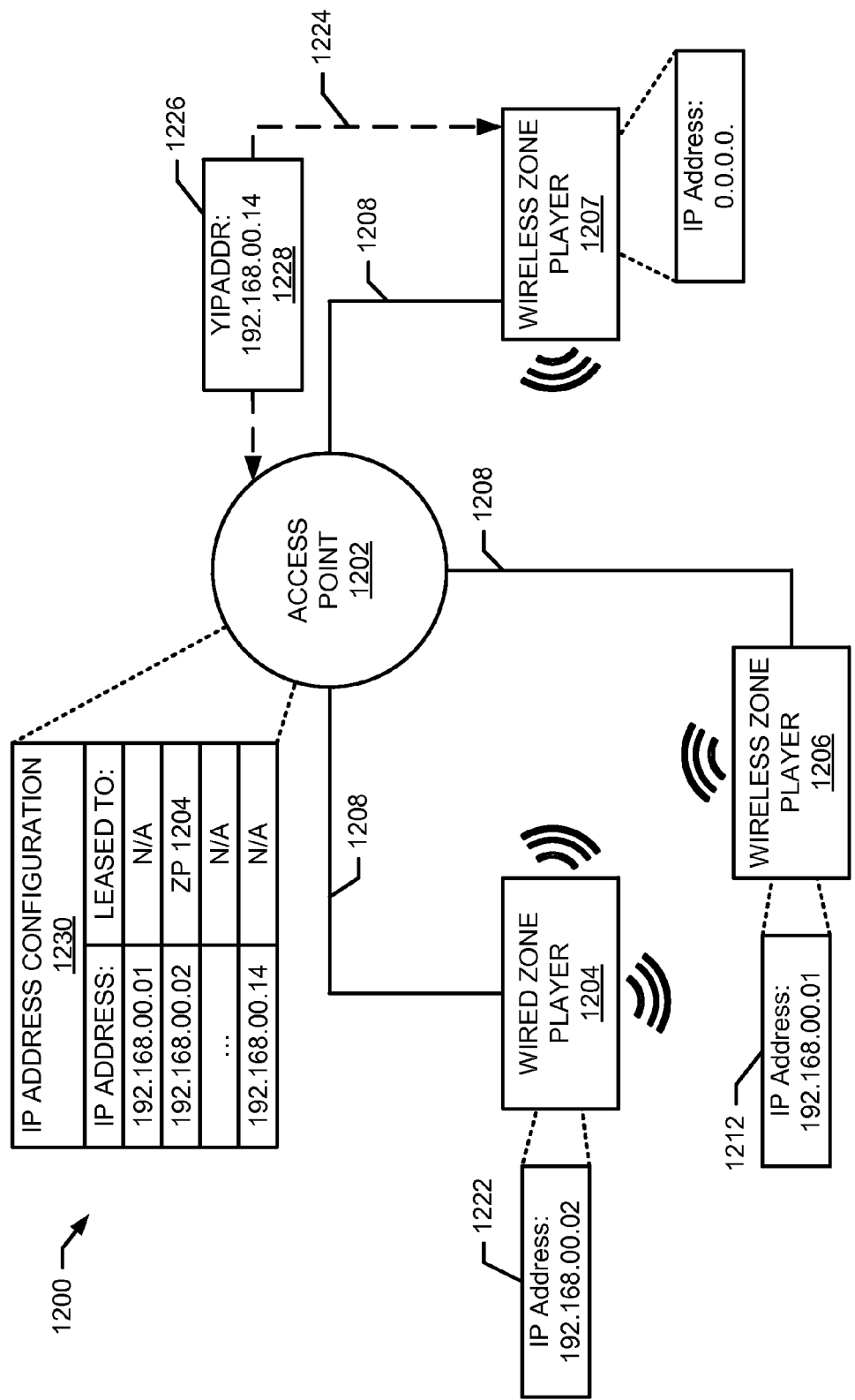

As an illustrative example, FIGS. 12a and 12b show example flow paths for resolving IP address conflicts in an example environment 1200 such as the example media system configuration 100 (FIG. 1). The example environment 1200 includes an example access point 1202 (e.g., a wired and/or wireless router), an example wired zone player 1204, and example wireless zone players 1206, 1207. The example access point 1202, the example wired zone player 1204 and the example wireless zone players 1206, 1207 are in communication via an example data network 1208. The example wired zone player 1204 is in communication with the example access point 1202 via a wired interface (e.g., the example wired interface 406 (FIG. 4)). The example wireless zone players 1206, 1207 are in communication with the example access point 1202 via a wireless interface (e.g., the example wireless interface 404 (FIG. 4)).

FIG. 12a is representative of the state of the example environment 1200 after the access point 1202 reboots. Accordingly, the example access point 1202 includes an IP address configuration 1210 that indicates all IP addresses on the example data network 1208 are available (e.g., are not leased to any devices). Thus, the example access point 1202 is unaware that the example wireless zone player 1206 is leasing IP address 1212 (e.g., 102.168.00.01) and that the example wireless zone player 1207 is leasing IP address 1213 (e.g., 102.168.00.02). In addition, the example wired zone player 1204 having detected the access point reboot, broadcasts an IP address lease renew request 1214 over the data network 1208. However, because the IP address configuration 1210 does not include any IP address leasing information, the example access point 1202 sends a negative acknowledgement message 1215 to the wired zone player 1204. Accordingly, the example wired zone player 1204 of FIG. 12a has no IP address 1216 (e.g., 0.0.0.0) and initiates a new binding process 1218 over the data network 1208. During the binding process 1218, the example wired zone player 1204 may broadcast a discover message (e.g., a DHCP_DISCOVER packet), and receive, in response to the discover message, a DHCP_OFFER packet from the access point 1202. The DHCP_OFFER packet may include an IP address offered to the wired zone player 1204 (in this example IP address 1222 (e.g., 192.168.00.02)). In response to the DHCP_OFFER packet, the example wired zone player 1204 may broadcast a DHCP_REQUEST packet that includes the IP address 1222 (e.g., 192.168.00.02).

FIG. 12b is representative of the state of the example environment 1200 after the example access point 1202 leases the IP address 1222 to the wired zone player 1204. In response to the access point 1202 obtaining an IP address lease request message (e.g., the DHCP_REQUEST message) from the wired zone player 1204, the example wireless zone players 1206, 1207 also detect the request message. For example, the wireless zone players 1206, 1207 may include a passive resolver (e.g., the example passive resolver 424 (FIGS. 4 and/or 9)) that monitors the UDP server port (67) for IP address lease request messages sent to the access point 1202. In the illustrated example, the passive resolver of the wireless zone player 1206 may determine that duplicate IP addresses do not exist. For example, the wireless zone player 1206 may compare its IP address 1212 (e.g., 192.168.00.01) to the IP address 1222 (e.g., 192.168.00.02) included in the example request message 1220 and determine that the two IP addresses do not match (e.g., are not the same or equal). Accordingly, the example wireless zone player 1206 does not request an IP address renewal and the example access point 1202 remains unaware that the IP address 1212 is leased to a device on the date network 1208.

In contrast, the passive resolver of the wireless zone player 1207 may determine that duplicate IP addresses do exist. For example, the wireless zone player 1207 may compare its IP address 1212 (e.g., 192.168.00.02) to the IP address 1222 (e.g., 192.168.00.02) and determine that the two IP addresses match (e.g., are the same or equal). Accordingly, the example wireless zone player 1207 initiates an IP address renewal, which results in the wireless zone player 1207 losing its IP address when the access point 1202 unicasts or broadcasts a negative acknowledgement message to the wireless zone player 1207. As a result, the example wireless zone player 1207 initiates a new binding process 1224, which includes an IP address lease request 1226 with an IP address 1228 (e.g., 192.168.00.14).

In the illustrated example of FIG. 12b, the example IP Address Configuration 1230 is representative of the state of the data network 1208 after the access point 1202 leases the IP address 1228 to the wireless zone player 1207. For example, the IP Address Configuration 1230 includes that the IP address 1222 is leased to the wired zone player 1204, that the IP address 1212 is not leased to a device on the data network 1208, and that the IP address 1228 is leased to the wireless zone player 1207. Thus, in the illustrated examples of FIGS. 12a and 12b, the wireless zone player 1207 passively facilitated resolution of an IP address conflict in the data network 1208 by monitoring messages sent to the access point 1202 and requesting an IP address renewal when an IP address included in a message sent to the access point 1202 matched the IP address of the zone player 1207.

Figure 13:
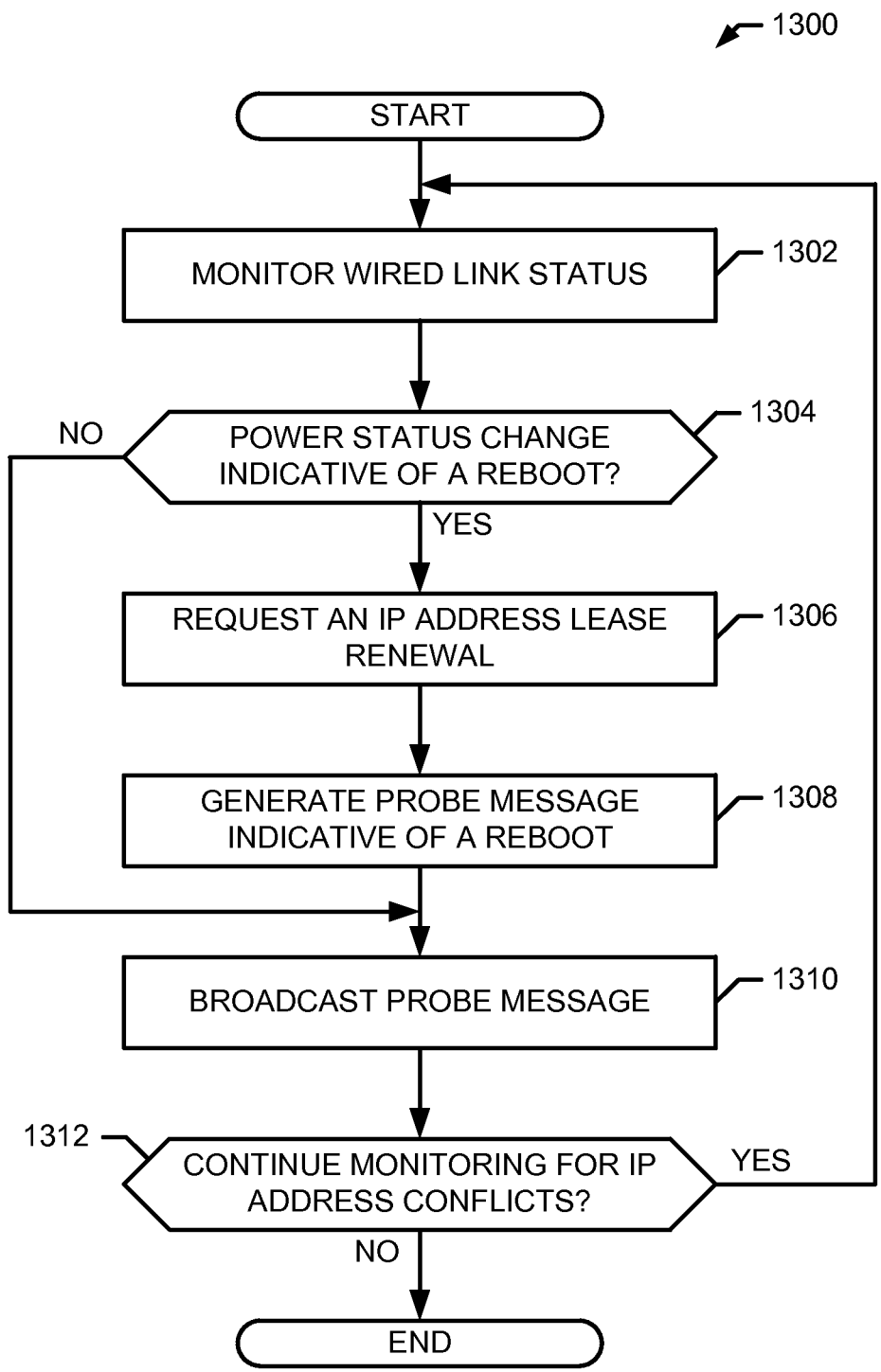
FIG. 13 shows an illustrative flowchart for another example method for resolving IP address conflicts.

FIG. 13 shows an illustrative flowchart for another example method 1300 to facilitate resolution of IP address conflicts, in accordance with at least some embodiments described herein. For example, the example method 1300 may use the example active resolver 426 to facilitate resolution of IP address conflicts. The example method 1300 of FIG. 13 begins at block 1302 when the example active resolver 426 (FIGS. 4 and/or 10) monitors the power status of a wired link of the zone player 400 (FIG. 4). For example, the wired interface monitor 1002 (FIG. 10) may monitor the eth0 status of the wired interface 406 (FIG. 4). At block 1304, the example active resolver 426 determines whether a detected power status change is indicative of an access point reboot. For example, the wired interface monitor 1002 may determine whether the eth0 status changes from a power OFF state to a power ON state. If, at block 1304, the wired interface monitor 1002 determines that the detected power status change is not indicative of an access point reboot, then control proceeds to block 1310 to send a probe message.

Otherwise, if, at block 1304, the wired interface monitor 1002 determines that the detected power status change is indicative of an access point reboot, then, at block 1306, the active resolver 426 requests an IP address lease renewal. For example, the example wired interface monitor 1002 may initiate the example IP leaser 428 (FIG. 4) to initiate an IP address renew request. At block 1308, the example active resolver 426 generates a probe message indicative of the detected access point reboot. For example, the example message generator 1004 (FIG. 10) may generate a probe message including a set renew IP flag, the MAC address of the zone player 400, a message identifier, and a set or reset forwarding flag. At block 1310, the example active resolver 426 broadcasts a probe message. For example, the message generator 1004 may broadcast the probe message generator at block 1308. Alternatively, if, at block 1304, the wired interface monitor 1002 did not detect an access point reboot, then, at block 1310, the example message generator 1004 may broadcast a previously obtained probe message. For example, the message generator 1004 may forward a probe message that includes a set forwarding flag. At block 1312, the example active resolver 426 determines whether to continue monitoring for IP address conflicts. If the active resolver 426 determines to continue monitoring for IP address conflicts, control returns to block 1302 to monitor the wired interface power status. Otherwise, if, at block 1312, the active resolver 426 determines not to continue monitoring for IP address conflicts (e.g., due to an application/process shutdown event, a hardware shutdown event, etc.), the example method of FIG. 13 ends.

Figure 14:
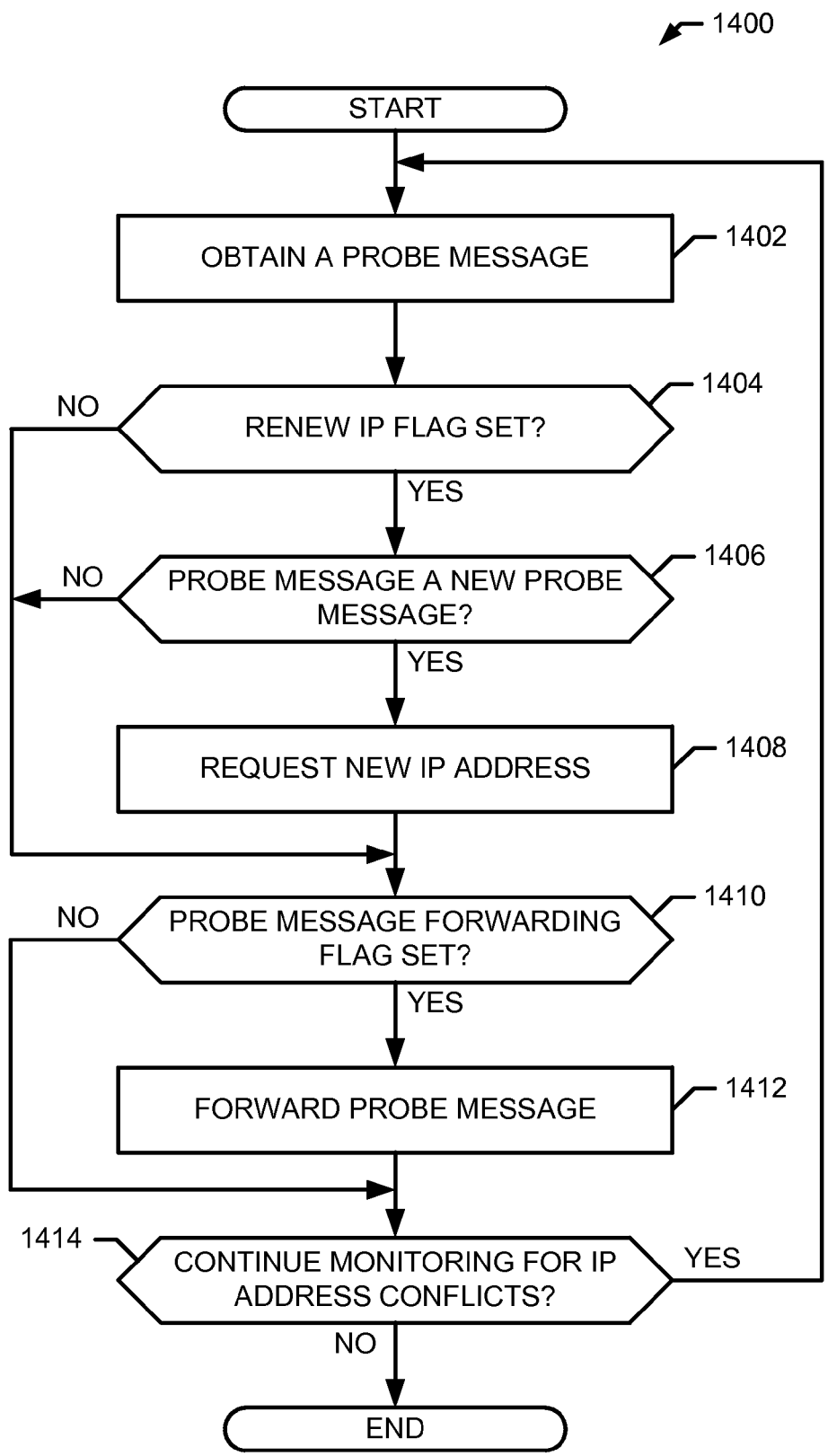
FIG. 14 shows an illustrative flowchart for another example method for resolving IP address conflicts.

FIG. 14 shows an illustrative flowchart for another example method 1400 to facilitate resolution of IP address conflicts, in accordance with at least some embodiments described herein. For example, the example method 1400 may use the example active resolver 426 to facilitate resolution of IP address conflicts. The example method 1400 of FIG. 14 begins at block 1402 when the example active resolver 426 (FIGS. 4 and/or 10) obtains a probe message. For example, the probe handler 1006 (FIG. 10) may obtain a probe message from another zone player on the data network 128 (FIG. 1). At block 1404, the example active resolver 426 determines whether the probe message includes a set renew IP flag. For example, the probe handler 1006 may parse the obtained probe message to check the status of the renew IP flag. If, at block 1404, the probe handler 1006 determines that the renew IP flag is not set, then control proceeds to block 1410 to determine whether the probe message includes a set forwarding flag.

Otherwise, if, at block 1404, the probe handler 1006 determines that the probe message does include a set renew IP flag, then, at block 1406, the example active resolver 426 determines whether the probe message is a new probe message. For example, the renew handler 1008 (FIG. 10) may compare the message identifier of the probe message to previously obtained message identifiers retrieved from the example database 430 (FIG. 4). If, at block 1406, the example renew handler 1008 determines that the obtained probe message is not a new probe message (e.g., the obtained probe message identifier matches a message identifier retrieved from the database 430), then control proceeds to block 1410 to determine whether the probe message includes a set forwarding flag.

Otherwise, if, at block 1406, the renew handler 1008 determines that the obtained probe message is a new probe message (e.g., the obtained probe message identifier does not match a message identifier retrieved from the database 430), then, at block 1408, the example active resolver 426 requests a new IP address. For example, the renew handler 1008 may initiate the example IP leaser 428 (FIG. 4) to request an IP address lease renewal.

Regardless of whether the probe handler 1002 determines that the obtained probe message included a reset renew IP flag at block 1404, or the renew handler 1008 initiates an IP address lease renewal at block 1408, at block 1410, the example active resolver 426 determines whether the probe message forwarding flag is set. For example, the probe handler 1006 may parse the probe message obtained at block 1402 to check the status of the forwarding flag. If, at block 1410, the probe handler 1006 determines that the forwarding flag is not set, then control proceeds to block 1414 to determine whether to continue monitoring for IP address conflicts.

Otherwise, if, at block 1410, the probe handler 1006 determines that the forwarding flag is set, then, at block 1412, the active resolver 426 forwards the obtained probe message. For example, the message generator 1004 may broadcast the content of the obtained probe message (e.g., whether the renew IP flag is set or reset, etc.) to other zone players on the data network 128. At block 1414, the example active resolver 426 determines whether to continue monitoring for IP address conflicts. If the active resolver 426 determines to continue monitoring for IP address conflicts, control returns to block 1402 to obtain a new probe message. Otherwise, if, at block 1414, the active resolver 426 determines not to continue monitoring for IP address conflicts (e.g., due to an application/process shutdown event, a hardware shutdown event, etc.), the example method of FIG. 14 ends.

Figure 15A:
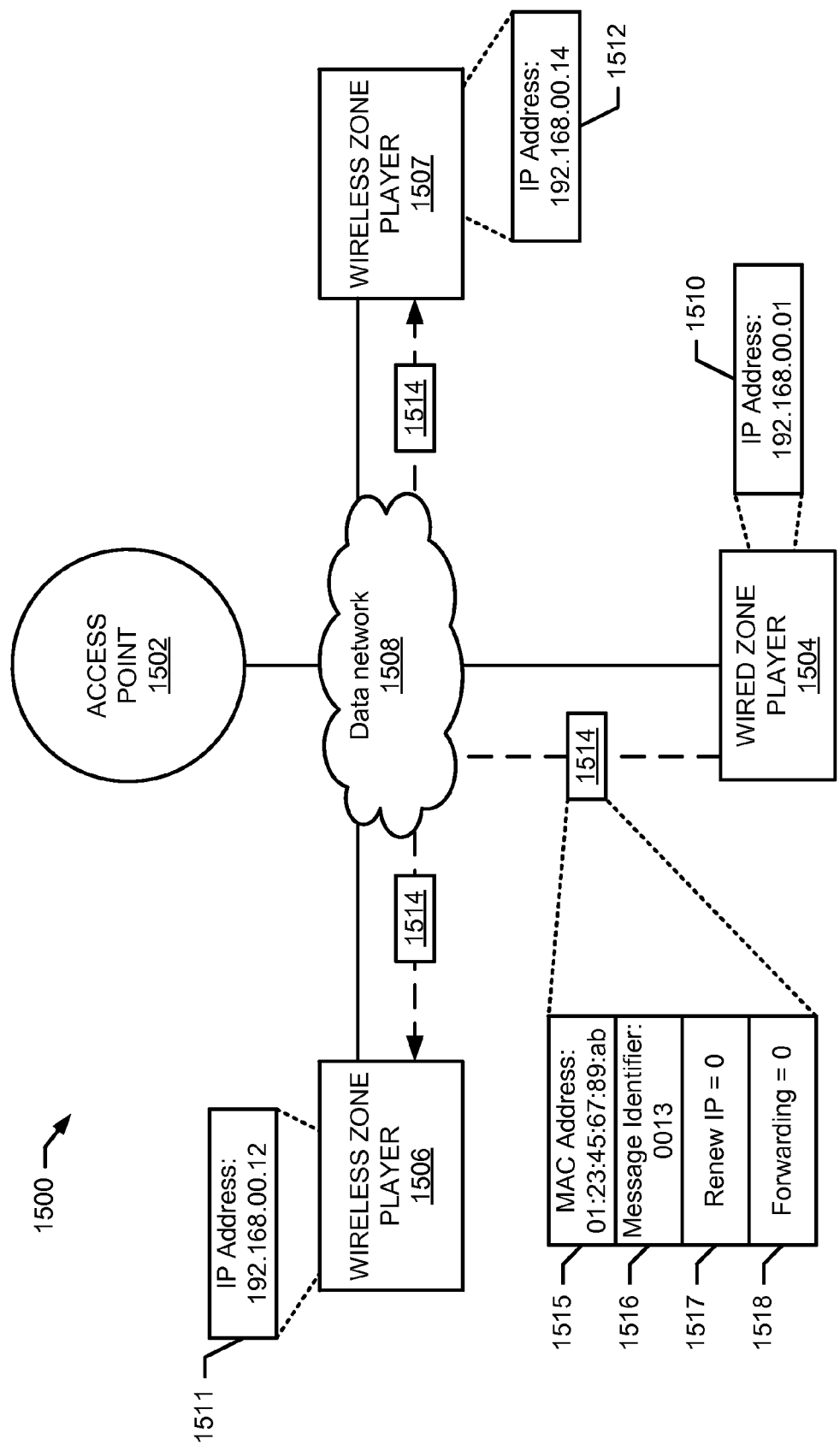
FIGS. 15a and 15b show illustrative flow paths for resolving IP address conflicts in another example environment.
Figure 15B:
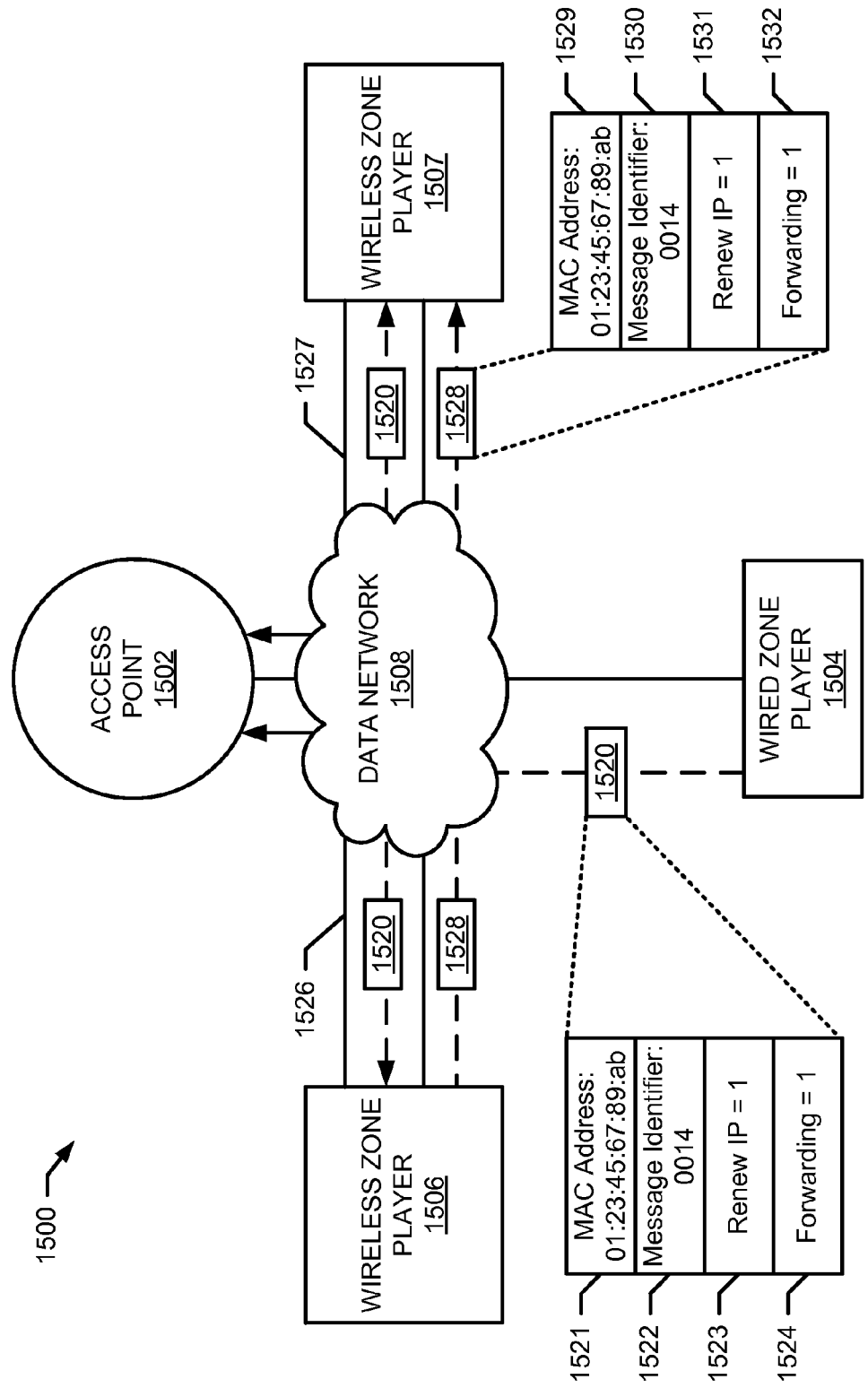

As an illustrative example, FIGS. 15*a* and 15*b* show example flow paths for resolving IP address conflicts in an example environment 1500 such as the example media system configuration 100 (FIG. 1). The example environment 1500 includes an example access point 1502 (e.g., a wired and/or wireless router), an example wired zone player 1504, and example wireless zone players 1506, 1507. The example access point 1502, the example wired zone player 1504 and the example wireless zone players 1506, 1507 are in communication via an example data network 1508. The example wired zone player 1504 is in communication with the example access point 1502 via a wired interface (e.g., the example wired interface 406 (FIG. 4)). The example wireless zone players 1506, 1507 are in communication with the example access point 1502 via a wireless interface (e.g., the example wireless interface 404 (FIG. 4)).

FIG. 15*a* is representative of the state of the example environment 1500 before an access point reboot is detected. In the illustrated example of FIG. 12*a*, the wired zone player 1504 is leasing an IP address 1510 (e.g., 192.168.00.01) from the access point 1502, the example wireless zone player 1506 is leasing an IP address 1511 (e.g., 192.168.00.12) from the access point 1502, and the example wireless zone player 1507 is leasing an IP address 1512 (e.g., 192.168.00.04) from the access point 1502. The example wired zone player 1504 periodically (e.g., every 500 milliseconds) broadcasts a probe message 1514 over the data network 1508. In the illustrated example, the probe message 1514 is obtained by the wireless zone players 1506, 1507, and the probe message 1514 includes a MAC address identifier 1515 (e.g., 01:23:45:67:89:ab), a message identifier 1516 (e.g., 0013), a renew IP flag 1517 (e.g., zero), and a forwarding flag 1518 (e.g., one). The example MAC address identifier 1515 identifies the zone player that generated the probe message (e.g., the wired zone player 1504). The example message identifier 1516 is a locally generated identifier (e.g., generated by the example message generator 1004 (FIG. 10) of the zone player generating the probe message). For example, the message identifier 1516 may be a 16-bit alphanumeric identifier. The example renew IP flag 1517 is indicative of whether a receiving zone player is to renew its IP address lease. In the illustrated example of FIG. 15*a*, a probe handler 1006 (FIG. 10) of the wireless zone player 1506 may parse the obtained probe message 1514 and determine that the wireless zone player 1506 is not to renew its IP address lease with the access point 1502. The example forwarding flag 1518 is indicative of whether a receiving zone player is to forward the content of the probe message to other zone players on the data network 1508. For example, the wireless zone player 1507 may parse the obtained probe message 1514 (e.g., via the probe handler 1006) and determine not to forward (e.g., broadcast) the content of the probe message 1514 over the data network 1508 to other zone players.

FIG. 15*b* is representative of the state of the example environment 1500 after the example wired zone player 1504 detects an access point reboot. For example, the eth0 status of the wired interface 406 (FIG. 4) of the wired zone player 1504 may change from a power ON state to a power OFF state and back to a power ON state. In response to the detected reboot of the example access point 1502, the example wired zone player 1504 broadcasts an IP address renewal request and subsequently initiates a new binding process 1519 (e.g., in response to a negative acknowledgement from the access point 1502).

In addition to initiating the new binding process 1519, the example wired zone player 1504 generates a new probe message 1522 that is broadcast over the data network 1508. The example probe message 1522 includes a MAC address identifier 1521 (e.g., 01:23:45:67:89:ab), a message identifier 1522 (e.g., 0014), a renew IP flag 1523 (e.g., one), and a forwarding flag 1524 (e.g., one). The example MAC address identifier of the probe message 1514 and the probe message 1520 are the same as both probe messages 1514, 1520 are generated by the same zone player. The different message identifier 1522 of the probe message 1520 indicates that the probe message 1520 is different from the probe message 1514, and, as a result, the renew IP flag of the probe message 1520 is processed rather than discarded. The renew IP flag 1523 of the probe message 1520 is set (e.g., one) and causes receiving zone players of the probe message 1520 to request IP address lease renewals. For example, the wireless zone player 1506 initiates an IP address lease renewal request 1526 and the wireless zone player 1507 initiates an IP address lease renewal request 1527 in response to processing the obtained probe message 1520.

In the illustrated example of FIG. 15*b*, the example forwarding flag 1524 is set (e.g., one). Thus, in response to the wireless zone players 1506, 1507 obtaining the probe message 1520, each respective wireless zone player generates a probe message including the content of the probe message 1520. For example, the wireless zone player 1506 generates a probe message 1528 that is broadcast over the data network 1508. In the illustrated example, the probe message 1528 of FIG. 15*b* includes a MAC address identifier 1529 (e.g., 01:23:45:67:89:ab) that is the same as the MAC address identifier 1521 of the probe message 1520, a message identifier 1530 (e.g., 0014) that is the same as the message identifier 1522 of the probe message 1520, a renew IP flag 1531 (e.g., one) that is the same as the renew IP flag 1523 of the probe message 1520, and a forwarding flag 1532 that is the same as the forwarding flag 1524 of the probe message 1520. In some examples, the forwarding flag 1532 may be different than the forwarding flag 1524. For example, the wireless zone player 1506 may include a state variable that determines whether a zone player is to forward probe messages.

Thus, in the illustrated examples of FIGS. 15a and 15b, the zone players 1504, 1506, 1507 of the environment 1500 actively facilitate resolution of IP address conflicts in the data network 1508 by causing other zone players to request an IP address lease renewal in response to detecting an access point reboot on the data network 1508.

IX. Conclusion

The descriptions above disclose various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components can be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

As suggested above, the present application involves resolving IP address conflicts. In one aspect, a first method is provided. The first method involves listening, by a first playback device having a first Internet Protocol (IP) address, to a specified server port. The first method also includes receiving, by the first playback device from a second playback device via the specified server port, a message, wherein the message identifies a second IP address, wherein the second IP address has been assigned to the second playback device. The first method also includes determining, by the first playback device, whether the first IP address is the same as the second IP address. The first method also includes, when the first IP address is the same as the second IP address, obtaining, by the first playback device, a new IP address, wherein the new IP address is different from the first IP address and the second IP address.

In another aspect, a second method is provided. The second method involves a network comprising at least a playback device and an access point, wherein there is a connection via a wire between the access point and the playback device. The second method includes periodically broadcast, by the playback device over the network, a probe message. The second method also includes detecting, by the playback device, a change in status associated with the connection. The second method also includes, based on the detection, obtaining, by the playback device, a new Internet Protocol (IP) address. The second method also includes, based on the detection, including, by the playback device in at least one probe message broadcast subsequent to the detection, an indication that other playback devices on the network should obtain a new IP address.

In a further aspect, a first non-transitory computer readable medium having instructions stored thereon is provided. The instructions are executable by a first playback device having a first Internet Protocol (IP) address to cause the first playback device to perform functions including listening to a specified server port. The instructions also cause the first playback device to receive from a second playback device via the specified server port, a message, wherein the message identifies a second IP address, wherein the second IP address has been assigned to the second playback device. The instructions are also cause the first playback device to determine whether the first IP address is the same as the second IP address. The instructions are also cause the first playback device to, when the first IP address is the same as the second IP address, obtain a new IP address, wherein the new IP address is different from the first IP address and the second IP address.

In yet another aspect, a second non-transitory computer readable medium having instructions stored thereon is provided. The instructions are executable by a playback device to cause the playback device to perform functions including periodically broadcasting a probe message over a network. The instructions also cause the playback device to detect a change in status associated with a wired connection to the playback device. The instructions also cause the playback device to, based on the detection, obtain a new Internet Protocol (IP) address. The instructions also cause the playback device to, based on the detection, include in at least one probe message broadcast subsequent to the detection, an indication that other playback devices on the network should obtain a new IP address.

In yet another aspect, a first system involves a playback device including a network interface, a processor, data storage, and program logic stored in the data storage and executable by the processor to listen to a specified server port via the network interface. The program logic to also cause the processor to receive from a second playback device via the specified server port, a message, wherein the message identifies a second Internet Protocol (IP) address, wherein the second IP address has been assigned to the second playback device. The program logic to also cause the processor to determine whether a first IP address assigned to the playback device is the same as the second IP address. The program logic to also cause the processor to, when the first IP address is the same as the second IP address, obtain a new IP address, wherein the new IP address is different from the first IP address and the second IP address.

In yet another aspect, a second system involves a playback device including a network interface, a processor, data storage, and program logic stored in the data storage and executable by the processor to periodically broadcast a probe message over a network. The program logic to also cause the processor to detect a change in status associated with a wired connection to the playback device. The program logic to also cause the processor to, based on the detection, obtain a new Internet Protocol (IP) address. The program logic to also cause the processor to, based on the detection, include in at least one probe message broadcast subsequent to the detection, an indication that other playback devices on the network should obtain a new IP address.

Additionally, references herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

The example processes of FIGS. 11, 13 and/or 14 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 11, 13 and/or 14 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

We claim:

1. A method comprising:
   determining, by a first audio playback device, that a message sent by a second audio playback device to a specified server port includes a first lease renew request of the second audio playback device, wherein the first audio playback device is assigned a first Internet Protocol (IP) address, wherein the first IP address was assigned by a host device; and wherein a zone group comprises the first audio playback device and the second audio playback device;
   determining, by the first audio playback device, that the first IP address of the first audio playback device is the same as a second IP address identified in the first lease renew request of the second audio playback device;
   in response to determining that the first IP address of the first audio playback device is the same as the second IP address identified in the first lease renew request of the second audio playback device, obtaining, by the first audio playback device from the host device, a new IP address by sending a second lease renew request to the specified server port, wherein the new IP address is different from the first IP address and the second IP address;
   after obtaining the new IP address, receiving, by the first audio playback device, a stream of audio content;
   sending, by the first audio playback device, the audio content to the second audio playback device; and
   playing, by the first audio playback device, audio based on the audio content in synchrony with the zone group.

2. The method of claim 1, wherein the specified server port comprises UDP port 67.

3. The method of claim 1, wherein the first lease renew request is a DHCP_REQUEST packet.

4. The method of claim 3, wherein the DHCP_REQUEST packet includes an options field, and wherein the options field identifies the second IP address.

5. The method of claim 1, wherein the host device is a DHCP server; and wherein obtaining the new IP address comprises:
   transmitting, by the first audio playback device to the DHCP server, a DHCP request, wherein the second lease renew request comprises the DCHP request; and
   receiving, by the first audio playback device from the DHCP server, a DHCP acknowledgement, wherein the DHCP acknowledgement includes the new IP address.

6. The method of claim 5, wherein the first audio playback device comprises a first zone player, and wherein the second audio playback device comprises a second zone player.

7. The method of claim 6, wherein the DHCP server comprises an access point.

8. The method of claim 1, wherein the specified server port is an input port to the host device.

9. A non-transitory computer-readable storage medium including a set of instructions for execution by a processor, the set of instructions, when executed, cause a first playback device having a first Internet Protocol (IP) address to:
   determine, by a first audio playback device, that a message sent by a second audio playback device to a specified server port includes a first lease renew request of the second audio playback device, wherein the first audio playback device is assigned a first Internet Protocol (IP) address, wherein the first IP address was assigned by a host device; and wherein a zone group comprises the first audio playback device and the second audio playback device;
   determine that the first IP address of the first audio playback device is the same as a second IP address identified in the first lease renew request of the second audio playback device;
   in response to determining that the first IP address of the first audio playback device is the same as the second IP address identified in the first lease renew request of the second audio playback device, obtain a new IP address from the host device by sending a second lease renew request to the specified server port, wherein the new IP address is different from the first IP address and the second IP address;
   after obtaining the new IP address, receive, by the first audio playback device, a stream of audio content;

send, by the first audio playback device, the audio content to the second audio playback device; and play, by the first audio playback device, audio based on the audio content in synchrony with the zone group.

10. The computer-readable medium of claim 9, wherein the specified server port comprises UDP port 67.

11. The computer-readable medium of claim 9, wherein the first lease renew request is a DHCP_REQUEST packet.

12. The computer-readable medium of claim 11, wherein the DHCP_REQUEST packet includes an options field, and wherein the options field identifies the second IP address.

13. The computer-readable medium of claim 9, wherein the host device is a DHCP server; and wherein obtaining the new IP address comprises instructions that when executed cause the first playback device to:
  transmit to the DHCP server, a DHCP request; wherein the second lease renew request comprises the DCHP request; and
  receive from the DHCP server, a DHCP acknowledgement, wherein the DHCP acknowledgement includes the new IP address.

14. The computer-readable medium of claim 13, wherein the first audio playback device comprises a first zone player, and wherein the second audio playback device comprises a second zone player.

15. The computer-readable medium of claim 14, wherein the DHCP server comprises an access point.

16. A first audio playback device comprising:
  a network interface;
  a processor;
  data storage; and
  program logic stored in the data storage and executable by the processor to:
  determine, by the first audio playback device, that a message sent by a second audio playback device to a specified server port includes a first lease renew request of the second audio playback device, wherein the first audio playback device is assigned a first Internet Protocol (IP) address, wherein the first IP address was assigned by a host device; and wherein a zone group comprises the first audio playback device and the second audio playback device;
  determine that a first IP address assigned to the first audio playback device is the same as a second IP address identified in the first lease renew request of the second audio playback device;
  in response to determining that the first IP address of the first audio playback device is the same as the second IP address identified in the first lease renew request of the second audio playback device, obtain a new IP address from the host device by sending a second lease renew request to the specified server port, wherein the new IP address is different from the first IP address and the second IP address;
  after obtaining the new IP address, receive, by the first audio playback device, a stream of audio content;
  send, by the first audio playback device, the audio content to the second audio playback device; and
  play, by the first audio playback device, audio based on the audio content in synchrony with the zone group.

17. The first audio playback device of claim 16, wherein the specified server port comprises UDP port 67.

18. The first audio playback device of claim 16, wherein the first lease renew request is a DHCP_REQUEST packet.

19. The first audio playback device of claim 18, wherein the DHCP_REQUEST packet includes an options field, and wherein the options field identifies the second IP address.

20. The first audio playback device of claim 16, wherein the host device is a DHCP server; and wherein obtaining the new IP address comprises program logic stored in the data storage that when executed cause the first playback device to:
  transmit to the DHCP server, a DHCP request wherein the second lease renew request comprises the DCHP request; and
  receive from the DHCP server, a DHCP acknowledgement, wherein the DHCP acknowledgement includes the new IP address.

21. The first audio playback device of claim 20, wherein (i) the first audio playback device comprises a first zone player, and (ii) the second audio playback device comprises a second zone player.

22. The non-transitory computer-readable storage medium of claim 9, wherein the specified server port is an input port to the host device.

23. The first audio playback device of claim 16, wherein the specified server port is an input port to the host device.

* * * * *